US010516616B2

(12) United States Patent
Lopez Serrano et al.

(10) Patent No.: US 10,516,616 B2
(45) Date of Patent: *Dec. 24, 2019

(54) METHOD AND APPARATUS FOR NETWORK CONGESTION CONTROL BASED ON TRANSMISSION RATE GRADIENTS

(71) Applicant: Bequant S.L., Madrid (ES)

(72) Inventors: Jose Lopez Serrano, Madrid (ES); Luis Piñeiro Blanca, Madrid (ES); Guillermo Lopez Serrano, Madrid (ES)

(73) Assignee: BEQUANT S.L., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,834

(22) Filed: Feb. 21, 2019

(65) Prior Publication Data

US 2019/0190831 A1 Jun. 20, 2019

Related U.S. Application Data

(63) Continuation of application No. 15/304,971, filed as application No. PCT/EP2015/056962 on Mar. 31, 2015, now Pat. No. 10,263,894.

(30) Foreign Application Priority Data

Apr. 23, 2014 (EP) .................................... 14382146

(51) Int. Cl.
*H04L 12/803* (2013.01)
*H04L 12/801* (2013.01)

(52) U.S. Cl.
CPC ............ *H04L 47/122* (2013.01); *H04L 47/11* (2013.01); *H04L 47/127* (2013.01); *H04L 47/14* (2013.01);
(Continued)

(58) Field of Classification Search
CPC .......................... H04L 47/122; H04L 47/127
See application file for complete search history.

(56) References Cited

U.S. PATENT DOCUMENTS

| | | | |
|---|---|---|---|
| 6,097,697 A | 8/2000 | Yao et al. | |
| 6,643,259 B1 | 11/2003 | Borella et al. | |

(Continued)

FOREIGN PATENT DOCUMENTS

| | | |
|---|---|---|
| CN | 101087244 A | 12/2007 |
| CN | 102104908 A | 6/2011 |
| JP | 5826892 B1 | 12/2015 |

OTHER PUBLICATIONS

Marfia et al., "TCP Libra: Exploring RTT-Fairness for TCP," in Networking 2007. Ad Hoc and Sensor Networks, Wireless Networks, Next Generation Internet, Springer, 2007, pp. 1005-1013.
(Continued)

*Primary Examiner* — Zhiren Qin
(74) *Attorney, Agent, or Firm* — The Webb Law Firm

(57) ABSTRACT

A method for congestion control in a data communication protocol employing acknowledged communication may include measuring a flight size. A transmission rate may be measured. A trend of the flight size may be determined. A trend of the transmission rate may be determined, and the trend may be derived from a transmission rate gradient calculation, in which either the transmission rate measurements or the transmission rate gradient calculations or both may be filtered to reduce their temporal variability. Whether there is a congestion may be detected according to the determined trend of the transmission rate and the trend of the flight size. Upon detection of the congestion, a change may be made from a current congestion control state to a new congestion control state. Data may be transmitted while respecting a maximum amount of unacknowledged data which the transmitting node may transmit. An apparatus is also disclosed.

30 Claims, 12 Drawing Sheets

(52) U.S. Cl.
CPC .............. *H04L 47/15* (2013.01); *H04L 47/16* (2013.01); *H04L 47/17* (2013.01); *H04L 47/18* (2013.01); *H04L 47/193* (2013.01)

(56) References Cited

U.S. PATENT DOCUMENTS

| | | |
|---|---|---|
| 6,990,069 B1 | 1/2006 | Ramakrishnan |
| 7,092,355 B1 | 8/2006 | Duong-Van |
| 7,099,273 B2 | 8/2006 | Ha et al. |
| 7,130,268 B2 | 10/2006 | Mascolo |
| 7,200,111 B2 | 4/2007 | Garcia-Luna-Aceves et al. |
| 7,299,280 B2 | 11/2007 | Gerla et al. |
| 7,436,778 B1 | 10/2008 | Iannaccone et al. |
| 7,577,097 B2 | 8/2009 | Tan et al. |
| 7,593,335 B2 | 9/2009 | Mascolo |
| 7,636,321 B1 | 12/2009 | Iannaccone et al. |
| 7,693,052 B2 | 4/2010 | Jin et al. |
| 7,729,249 B2 | 6/2010 | Tan et al. |
| 7,760,638 B2 | 7/2010 | Shimonishi et al. |
| 7,778,164 B2 | 8/2010 | Shimonishi |
| 7,925,775 B2 | 4/2011 | Nishida |
| 7,974,195 B2 | 7/2011 | Jin et al. |
| 8,004,989 B2 | 8/2011 | Shimonishi |
| 8,125,910 B2 | 2/2012 | Shimonishi et al. |
| 8,281,356 B2 | 10/2012 | Ohno et al. |
| 8,514,715 B2 | 8/2013 | Jin et al. |
| 8,547,839 B2 | 10/2013 | Wang et al. |
| 2002/0071388 A1 | 6/2002 | Bergsson et al. |
| 2005/0033857 A1 | 2/2005 | Imiya |
| 2005/0063303 A1 | 3/2005 | Samuels et al. |
| 2005/0237929 A1 | 10/2005 | Leith et al. |
| 2006/0023634 A1 | 2/2006 | Morandin |
| 2007/0091918 A1 | 4/2007 | Luo et al. |
| 2007/0115814 A1 | 5/2007 | Gerla et al. |
| 2007/0121511 A1 | 5/2007 | Morandin |
| 2007/0127493 A1 | 6/2007 | Tsang et al. |
| 2008/0049746 A1 | 2/2008 | Morrill et al. |
| 2008/0126562 A1 | 5/2008 | Ludwig et al. |
| 2008/0205370 A1 | 8/2008 | Bae et al. |
| 2009/0141631 A1 | 6/2009 | Kim et al. |
| 2009/0154356 A1 | 6/2009 | Wiemann et al. |
| 2010/0011270 A1 | 1/2010 | Yamamoto et al. |
| 2010/0027424 A1 | 2/2010 | Radunovic et al. |
| 2010/0061238 A1 | 3/2010 | Godbole et al. |
| 2010/0098047 A1 | 4/2010 | Zhou et al. |
| 2010/0172253 A1 | 7/2010 | Morita |
| 2010/0182905 A1 | 7/2010 | Matsushita et al. |
| 2010/0189112 A1 | 7/2010 | Nakata |
| 2010/0238805 A1 | 9/2010 | Ludwig et al. |
| 2010/0246402 A1 | 9/2010 | Komagata |
| 2011/0013572 A1* | 1/2011 | Huang .............. H04W 72/0446 370/329 |
| 2011/0019557 A1 | 1/2011 | Hassan et al. |
| 2011/0128853 A1 | 6/2011 | Nishimura |
| 2011/0149730 A1 | 6/2011 | Nemeth et al. |
| 2011/0158253 A1 | 6/2011 | Dukkipati et al. |
| 2011/0276699 A1 | 11/2011 | Pedersen |
| 2011/0292801 A1 | 12/2011 | Turnbull et al. |
| 2012/0063493 A1 | 3/2012 | Hasegawa et al. |
| 2012/0106571 A1* | 5/2012 | Jeon ........................ H04L 47/10 370/465 |
| 2012/0120801 A1 | 5/2012 | Ramakrishnan et al. |
| 2012/0147840 A1 | 6/2012 | Chen |
| 2012/0163167 A1 | 6/2012 | Dade |
| 2012/0163385 A1 | 6/2012 | Lee et al. |
| 2012/0236718 A1* | 9/2012 | Noureddin .............. H04L 47/12 370/235 |
| 2013/0044598 A1 | 2/2013 | Zhang et al. |
| 2013/0088955 A1 | 4/2013 | van den Berg et al. |
| 2013/0095872 A1 | 4/2013 | Sediq et al. |
| 2013/0114408 A1 | 5/2013 | Sastry et al. |
| 2013/0250767 A1 | 9/2013 | Zhong et al. |
| 2014/0164641 A1 | 6/2014 | Ye et al. |
| 2014/0169164 A1 | 6/2014 | Oguchi |
| 2015/0236966 A1* | 8/2015 | Francini .................. H04L 47/27 370/235 |

OTHER PUBLICATIONS

Mascolo et al., "TCP Westwood: Bandwidth Estimation for Enhanced Transport over Wireless Links," Proceedings of the 7th Annual International Conference on Mobile Computing and Networking, 2001, pp. 287-297.
Mathis et al., "Proportional Rate Reduction for TCP," 2013, pp. 1-16.
Mathis et al.; "IEFT RFC 2018: TCP Selective Acknowledgment options" from Oct. 1996; pp. 1-12.
McCullough et al., "The Role of End-to-End Congestion Control in Networks with Fairness-Enforcing Routers," 2013, 14 pgs.
Montenegro et al., "Long Thin Networks," 2000, 47 pgs.
Nichols et al., "Controlling Queue Delay," Communications of the ACM, 2012, pp. 42-50, vol. 55:7.
Postel, "IETF RFC 793: Transmission Control Protocol," 1981, 176 pgs.
Prakash et al., "The TCP Outcast Problem: Exposing Unfairness in Data Center Networks," 2012, 14 pgs.
Ramakrishnan et al., "IETF RFC 3168: The Addition of Explicit Congestion Notification (ECN)," Sep. 2001, 64 pgs.
Rhee et al., "CUBIC for Fast Long-Distance Networks," Aug. 2008, 22 pgs.
Sarolahti et al., "CongestionControl in Linux TCP," 2002, 14 pgs.
Shimonishi et al., "Improving Efficiency-Friendliness Tradeoffs of TCP in Wired-Wireless Combined Networks," 2005 IEEE International Conference on Communications, 2005, pp. 3548-3552.
Shimonishi et al., "TCP-Adaptive Reno for Improving Efficiency-Friendliness Tradeoffs of TCP Congestion Control Algorithm," Proc. PFLDnet, 2006, 5 pgs.
Shorten et al., "H-TCP: TCP for high-speed and long-distance networks," Proc. PFLDnet, 2004, 16 pgs.
Sing et al., "TCP New Vegas: Improving the Performance of TCP Vegas Over High Latency Links," Fourth IEEE International Symposium on Network Computing and Applications, 2005, 8 pgs.
Srijith et al., "TCP Vegas-A: Improving the Performance of TCP Vegas," Computer communications, 2005, pp. 429-440, vol. 28:4.
Tan et al., "A Compound TCP Approach for High-speed and Long Distance Networks," 2006, 12 pgs.
Wang et al., "A New Congestion Control Scheme: Slow Start and Search (Tri-S)," ACM SIGCOMM Computer Communication Review, 1991, pp. 32-43, vol. 21:1.
Wang et al., "Adaptive Bandwidth Share Estimation in TCP Westwood," IEEE Symposium on Computers and Communications, Taormina, Italy, 2002, 6 pgs.
Wang et al., "Eliminating Periodic Packet Losses in the 4.3-Tahoe BSD TCP Congestion Control Algorithm," ACM SIGCOMM Computer Communication Review, 1992, pp. 9-16, vol. 22:2.
Wang et al., "Fair TCP: A Novel TCP Congestion Control Algorithm to Tackle TCP's Challenges," 2012, 6 pgs.
Wang et al., "TCP Startup Performance in Large Bandwidth Networks," Twenty-third Annual Joint Conference of the IEEE Computer and Communications Societies, 2004, 24 pgs.
Wang et al., "TCP With Sender-Side Intelligence to Handle dynamic, Large, Leaky Pipes," IEEE Journal on Selected Areas in Communications, Feb. 2005, pp. 235-248, vol. 23:2.
Wei et al., "Assessing and Improving TCP Rate Shaping over Edge Gateways," IEEE Transactions on Computers, Mar. 2004, pp. 259-275, vol. 53:3.
Wei et al., "FAST TCP: Motivation, Architecture, Algorithms, Performance," IEEE/ACM Transactions on Networking, Dec. 2006, pp. 1246-1259, vol. 14:6.
Weigle et al., "A Case for TCP Vegas in High-Performance Computational Grids," Proceedings of the 9th International Symposium on High Performance Distributed Computing, Aug. 2001, 10 pgs.

(56) References Cited

OTHER PUBLICATIONS

Xu et al., "Binary Increase Congestion Control for Fast, Long Distance Networks," Twenty-third Annual Joint Conference of the IEEE Computer and Communications Societies, 2004, 13 pgs.
Yamada et al., "TCP Westwood with Agile Probing: Dealing with Dynamic, Large, Leaky Pipes," IEEE Communications Society, 2004, pp. 1070-1074.
Yang et al., "TCPW with Bulk Repeat in Next Generation Wireless Networks," IEEE International Conference, 2003, 5 pgs.
"ZetaTCP—An Intelligent Approach to Transport Acceleration," AppEx Networks Corporation, 2012, pp. 1-6.
Allman et al.; "IEFT RFC 5681: TCP Congestion Control" from Sep. 2009; pp. 1-18.
Afanasyev et al., "Host-to-Host Congestion Control for TCP," IEEE Communications Surveys & Tutorials, 2010 pp. 304-342, vol. 12:3.
Aggarwal et al., "Understanding the Performance of TCP Pacing," 2000, 9 pgs.
Aishwarya et al., "Changing TCP Variants on the Fly," International Institute of Information Technology—Bangalore, Technical Report IIITB-OS-2011-11A. Apr. 2011, 33 pgs.
Baiocchi et al., "YeAH-TCP: Yet Another Highspeed TCP", Proc. PFLDnet, 2007, pp. 37-42.
Bansal et al., "Dynamic behavior of slowly-responsive congestion control algorithms", Proceeding SIGCOMM, 2001, pp. 263-274.c.
Bhuiyan et al., "TCP Implementation in Linux: A Brief Tutorial," 2008. 2 pgs.
Blanton et al.; "IEFT RFC 6675: A Conservative Loss Recovery Algorithm Based on Selective Acknowledgment (SACK) for TCP" from 2012; pp. 1-15.
Brakmo et al., "TCP Vegas: End to End Congestion Avoidance on a Global Internet," IEEE Journal on Selected Areas in Communications, Oct. 1995, pp. 1465-1480, vol. 13:8.
Budzisz et al., "On the Fair Coexistence of Loss-Delay-Based TCP," IEEE/ACM Transactions on Networking, Dec. 2011, pp. 1811-1824, vol. 19:6.
Bullot et al., "Evaluation of Advanced TCP Stacks on Fast Long-Distance Production Networks," 2004, 12 pgs.
Cai et al., "Stochastic Convex Ordering for Multiplicative Decrease Internet Congestion Control," Apr. 2008, pp. 1-31.
Caini et al., "TCP Hybla: a TCP enhancement for heterogeneous networks," International Journal of Satellite Communications and Networking, 2004, pp. 547-566, vol. 22:5.
Chen et al., "Understanding TCP Incast Throughput Collapse in Datacenter Networks," WREN '09, Aug. 2009, pp. 73-82.
Chiu et al., "Analysis of the Increase and Decrease Algorithms for Congestion Avoidance in Computer Networks," Computer Networks and ISDN Systems, 1989, pp. 1-14, vol. 17:1.
De Cicco et al., "TCP Congestion Control over 3G Communication Systems: an Experimental Evaluation of New Reno, BIC and Westwood," 2007, 12 pgs.
Dukkipati et al., "Proportional Rate Reduction for TCP," IMC '11, Nov. 2011, 12 pgs.
Fall et al., "Simulation-based Comparisons of Tahoe, Reno, and SACK TCP," 1996, 17 pgs.
Feng et al., "Enabling Compatibility Between TCP Reno and TCP Vegas," IEEE Symposium on Applications and the Internet, Jan. 2003, 8 pgs.
Flach et al., "Reducing Web Latency: the Virtue of Gentle Aggression," SIGCOMM '13, Aug. 2013, 12 pgs.
Floyd et al., "A Comparison of Equation-Based and AIMD Congestion Control," May 12, 2000, 12 pgs.
Floyd et al., "On Traffic Phase Effects in Packet-Switched Gateways," 1992, 47 pgs.
Floyd et al., "Promoting the Use of End-to-End Congestion Control in the Internet", IEEE/ACM Transactions on Networking, 1999, pp. 1-16.
Floyd et al., "Random Early Detection Gateways for Congestion Avoidance," IEEE/ACM Transactions for Networking, 1993, pp. 397-413, vol. 1:4.
Floyd, "HighSpeed TCP for Large Congestion Windows," IETF RFC 3649, 2003, 35 pgs.
Fu et al., "TCP Veno: TCP Enhancement for Transmission Over Wireless Access Networks," IEEE Journal on Selected Areas in Communications, Feb. 2003, pp. 216-228, vol. 21:2.
Gerla et al., "TCP Westwood with adaptive bandwidth estimation to improve efficiency/friendliness tradeoffs," Computer Communications, 2003, pp. 41-58, vol. 27:1.
Ghobadi et al., "Trickle: Rate Limiting YouTube Video Streaming," 2012, pp. 1-6.
Grieco et al., "Performance Evaluation and Comparison of Westwood+, New Reno, and Vegas TCP Congestion Control," ACM SIGCOMM Computer Communication Review, 2004, pp. 25-38, vol. 34:2.
Ha et al., "CUBIC: A New TCP-Friendly High-Speed TCP Variant," ACM SIGOPS Operating Systems Review, 2008, pp. 64-74, vol. 42:5.
Ha et al., "Taming the elephants: New TCP slow start," Computer Networks, 2011, pp. 2092-2110, vol. 55:9.
Hasegawa et al., "Analysis and Improvement of Fairness Between TCP Reno and Vegas for Deployment of TCP Vegas to the Internet," in Network Protocols Proceedings International Conference, 2000, pp. 1-16.
Henderson et al.; "IEFT RFC 6582: The NewReno Modification to TCP's Fast Recovery Algorithm" from 2012; pp. 1-16.
Hoe, "Improving the Start-up Behavior of a Congestion Control Scheme for TCP," ACM SIGCOMM Computer Communication Review, 1996, 11 pgs.
Honda et al., "Is it Still Possible to Extend TCP?," IMC '11, 2011, pp. 181-194.
Jacobson et al., "Congestion Avoidance and Control," ACM SIGCOMM Computer Communication Review, Nov. 1988, 25 pgs.
Jain, "A Delay-Based Approach for Congestion Avoidance in Interconnected Heterogeneous Computer Networks," Apr. 1989, 16 pgs.
Jamal et al., "Performance Analysis of TCP Congestion Control Algorithms", International Journal of Computers and Communications, pp. 30-38, vol. 2, Issue 1.
Jin et al., "FAST TCP: Motivation, Architecture, Algorithms, Performance," Twenty-Third Annual Joint Conference of the IEEE Computer and Communications Societies, 2004, pp. 2490-2501.
Kaneko et al., "TCP-Fusion: A Hybrid Congestion Control Algorithm for High-speed Networks," Proc. PFLD-net, 2007, pp. 31-36.
Karandikar et al., "TCP Rate Control," 2000, 16 pgs.
Kelly, "Fairness and stability of end-to-end congestion control," 2003, pp. 1-36.
Kelly, "Scalable TCP: Improving Performance in Highspeed Wide Area Networks," ACM SIGCOMM Computer Communication Review, 2003, pp. 83-91, vol. 33:2.
Keshav, "A Control-Theoretic Approach to Flow Control," Computer Communication Review, 1991, pp. 191-201.
King et al., "TCP-Africa: An adaptive and Fair Rapid Increase Rule for Scalable TCP," 24th Annual Joint Conference of the IEEE Computer and Communications Societies, 2005, 11 pgs.
Kliazovich et al., "Logarithmic window increase for TCP Westwood+ for improvement in high speed, long distance networks," Computer Networks, 2008, pp. 2395-2410, vol. 52:12.
Li et al., "Experimental Evaluation of TCP Protocols for High-Speed Networks", IEEE/ACM Transactions on Networking, 2007, pp. 1109-1122, vol. 15:5.
Liu et al., "TCP-Illinois: A loss- and delay-based congestion control algorithm for high-speed networks," Performance Evaluation, 2008, pp. 417-440, vol. 65:6.
Low et al., "Complex Networks Part II, Internet Congestion Control," IEEE Control Systems Magazine, Feb. 2002, pp. 28-43.
Lundin et al., "A Google Congestion Control Algorithm for Real-Time Communication," Aug. 2013, pp. 1-18.

\* cited by examiner

METHOD AND APPARATUS FOR NETWORK CONGESTION CONTROL BASED ON TRANSMISSION RATE GRADIENTS

CROSS REFERENCE TO RELATED APPLICATIONS

This application is a continuation of U.S. patent application Ser. No. 15/304,971, filed on Oct. 18, 2016, which is the United States national phase of International Application No. PCT/EP2015/056962 filed on Mar. 31, 2015, which claims priority to European Patent Application No. 14382146.0 filed on Apr. 23, 2014, the disclosures of each of which are hereby incorporated by reference in their entireties.

BACKGROUND OF THE INVENTION

Field of the Invention

The present invention relates to the field of network communications and, more particularly, to a method and an apparatus for congestion control in network communications.

Congestion Control

Congestion situations arise in a data communications network whenever the available transmission capacity of a network node or link is lower than the data rate it needs to relay. For example, FIG. 1A shows a data transmitting node 110 sending a data flow 150 to a data receiving node 120 through a communications network 140, which includes a collection of interconnected network nodes 141, 142, 143, and possibly others. The data flow 150 is relayed in this case by network nodes 141 and 142. FIG. 1A further shows another data transmitting node 111 sending a data flow 151 to a data receiving node 121 through the same network 140. However, the data flow 151 is relayed in this case by network nodes 141 and 143. If the aggregated sent rate of data flows 150 and 151 is larger than the relaying capacity of network node 141, in which they coincide, then network node 141 will become congested and both data flows 150 and 151 will experience a congestion situation. If a network node (such as 141) has some input buffering capability, the congestion situation will cause its buffering capacity to be progressively used until it may eventually fill up. Once filled up, if the congestion situation persists, part of data flows 150 and 151 will be discarded and thus lost from the point of view of the data receiving nodes 120 and 121. Congestion control mechanisms are used to avoid, mitigate and handle congestion situations. Congestion control mechanisms can be part of the functionality of any layer, typically the link layer, the network layer, the transport layer or the application layer, and can reside in the end nodes (such as 110 or 111) or in the intermediate nodes (such as 141, 142 or 143).

As one of the most widely-used communication protocols nowadays, Transfer Control Protocol (TCP) uses sophisticated congestion control mechanisms. Many of the technical advances in the field of congestion control have taken place within the development of TCP. Thus, in the following, congestion control mechanisms in TCP will be described. However, many of the technical developments coming from TCP have later been adopted by other protocols, such as Stream Control Transmission Protocol (SCTP).

Standard TCP Protocol Congestion Control

Transport Control Protocol (TCP) is a widely used in data communication networks. The TCP, specified in J. Postel, "*IETF RFC 793: Transmission control protocol,*" 1981, and incorporated herein by reference, provides reliable data transmission between two endpoints. Endpoints are commonly referred to as "hosts" in literature concerning TCP technology. The term "reliable data transmission" refers to the fact that the TCP provides an adaptive repeat request (ARQ) mechanism enabling an acknowledged data transmission. In particular, as illustrated in FIG. 1B, a data transmitting node 110 transmits a data segment 101 (payload of TCP datagram) through a network 140, of which a data receiving node 120 checks the correct arrival. The data receiving node 120 then sends back to the data transmitting node 110, through a network 140, an acknowledgement 102 positively acknowledging the correct reception of the data. In accordance with this feedback 102, or the lack thereof, the data transmitting node 110 may retransmit the data. The acknowledgements are also transmitted in TCP segments and may be cumulative, i.e. the acknowledgement of a TCP segment implies the acknowledgement of all prior consecutive TCP segments.

Data packets may get lost, which means that they do not arrive within a predetermined time window (i.e. time period) at the data receiving node. Moreover, data packets may experience some transmission errors, which may be detected at the data receiving node by standard means including error detection/correction codes such as cyclic redundancy check (CRC) or others. The delay or transmission errors may be caused by increased load within the network and/or by worsening of the channel conditions. The acknowledgement mechanism provided by the TCP enables recovering the packet loss and corrupted data by means of retransmissions.

However, if the network experiences high load, repeated retransmissions by many users may further worsen the situation and the network may become congested. In order to avoid such a situation and in order to handle congestions, TCP provides some congestion control mechanisms and strategies, which may be implemented on the data transmitting node 110 and/or data receiving node 120.

In the following, standard TCP terminology will be employed, as used in RFC 793 cited above and *IETF RFC 5681 "TCP Congestion Control,"* from September 2009, in particular:

Host: a network node that is an end-point of a TCP communication. The term "host" will also be employed for other protocols to which the present invention may be applied, to mean a network node that is a communication end-point from the point of view of those protocols.

Connection: a bidirectional data flow established between two hosts, uniquely identified, with its own establishment, flow control and congestion control mechanisms independent of other data flows.

Congestion Window (cwnd) denotes the maximum amount of consecutive data a TCP host can send beyond the latest acknowledged sequence number, as calculated locally by the sending host, not having taken into account the window advertised by the receiving host.

Receive Window (rwnd) is the window size advertised by the receiver to the sender in the acknowledgement messages it sends back. This window size specifies the maximum amount of consecutive data the receiver is ready to accept beyond the latest acknowledged sequence number. This is the mechanism used by TCP to implement flow control, i.e. to prevent a fast sender from overwhelming a slow receiver.

Send Window is the lowest of cwnd and rwnd. Standard TCP congestion control is based on mechanisms for the sender, and thus focuses on setting an appropriate cwnd value, assuming that cwnd determines the Send Window.

Slow Start is a TCP congestion control state. In the Slow Start state, the TCP congestion control algorithm increases the cwnd in an exponential fashion, where cwnd is increased by about one segment size every time an acknowledgement is received. A TCP sending host in a TCP Connection is said to be in Slow Start when it is using this manner of increasing the cwnd.

Congestion Avoidance is a TCP congestion control state. In the Congestion Avoidance state, the TCP congestion control algorithm increases the cwnd in a slower fashion than in Slow Start. In standard Reno/New Reno TCP, the cwnd grows by 1/cwnd bytes (the inverse of cwnd) for every byte acknowledged, i.e. cwnd will grow by the size of one segment after acknowledging segments that add up cwnd bytes in size. Different TCP variants have different congestion avoidance algorithms. A TCP sending host in a TCP Connection is said to be in Congestion Avoidance when it is using this manner of increasing the cwnd.

Slow Start Threshold (ssthresh) defines the transition between Slow Start and Congestion Avoidance control states: it is the Congestion Window value below which Slow Start is used and beyond which the Congestion Window is increased according with Congestion Avoidance, Flight size is the amount of data, usually measured in bytes, transmitted by the sender and not yet acknowledged.

Buffer-bloat is a term for an excessive use of buffers in the transmission path by a connection using a larger congestion window than what would be required to overcome the intrinsic delay and bandwidth adaptation buffering in the transmission path.

The TCP terminology described above may also be used in other protocols which may use similar concepts as those used for TCP congestion control.

The TCP specifications, such as *IETF RFC 5681 cited above; IETF RFC 6582 "The NewReno modification to TCP's fast recovery algorithm,"* from 2012; *IETF RFC 2018: TCP selective acknowledgment options*" from October 1996; and *IETF RFC 6675: "A Conservative Loss Recovery Algorithm Based on Selective Acknowledgment (SACK) for TCP*" from 2012 (all incorporated herein by reference) include congestion control algorithms for determining the most appropriate data sending rate for the hosts and data recovery mechanisms to allow the efficient retransmission of data lost due to congestion or to other causes. As currently specified in the official Internet Engineering Task Force (IETF) RFC documents, the TCP congestion control approach is derived from the so-called "Reno" congestion control mechanism (described, for instance, in V. Jacobson, "*Congestion avoidance and control,*" *in ACM SIGCOMM Computer Communication Review,* 1988), with several additions to improve the recovery from packet transmission losses, and is based on the following principles:

Congestion control mechanisms are implemented in the TCP functionality of the communicating hosts, not relying on intermediate network-level and link-level nodes.

Cumulative acknowledgment segments are sent from the receiving endpoint when correct data segments are received, indicating the sequence number of the highest consecutive correct byte received.

The "Send Window" defined above, which, if not limited by the rwnd, is equal to cwnd, controls the amount of data transmitted by the sender.

At the beginning of the connection (and after retransmission time-outs), the sender starts with a minimal Congestion Window value and increments it with the "Slow Start" algorithm, as explained above.

If not limited by rwnd or the sender's output buffers, the Slow Start algorithm causes the sending rate to rapidly go up beyond the network capacity, resulting in packet losses.

Losses are detected by the sender when three duplicate acknowledgement segments are received. After a fast loss recovery procedure, the congestion window is set to half the maximum value attained during Slow Start and the connection is switched to Congestion Avoidance, which causes the Congestion Window to grow more slowly than in Slow Start.

In Congestion Avoidance, an Additive-Increase-Multiplicative-Decrease (AIMD) scheme is followed. The Congestion Window increases by a small fixed amount for every segment acknowledged, and is reduced by half after congestion is detected. Congestion is detected when packet loss occurs (three consecutive duplicate acknowledgements received). Even though this mechanism forces congestion to occur, it has been proved mathematically that several TCP flows sharing a bottleneck resource and following a similar AIMD scheme for Congestion Window growth will eventually share the available bandwidth in a fair manner.

Very heavy packet losses are not recoverable with the fast recovery procedure, which eventually causes the retransmission timer to be triggered in the TCP sender. This time-out will result in the first sent but not acknowledged segment to be retransmitted, after which the Slow Start phase is initiated, with the Congestion Window size reduced to one segment. This mechanism eventually makes all senders reduce their sending rate drastically in case of heavy congestion, which avoids a complete congestive collapse.

This standard TCP (sometimes called Reno or NewReno), has three limitations: (1) low performance in high-speed/long-delay networks, because the small rate of growth of the Congestion Window in Congestion Avoidance takes a very long time to achieve the large sizes of Congestion Window required by those networks; (2) excessive use of network buffers (buffer-bloat), increasing the delay experienced by the communicating hosts, due to the loss-based mechanism to detect congestion, which increases the Congestion Window up to the point where the buffers in the network nodes in the path are full and therefore sent packets get dropped, and (3) competition against concurrent TCP "greedy" flows, i.e. TCP flows that raise their Congestion Window in a more aggressive way than this standard TCP when they are sharing a bandwidth bottleneck, which will take most of the available bandwidth for themselves and starve Reno TCP flows.

As mentioned above, performance in high-speed/long-delay networks is limited with standard TCP, because the linear Congestion Window growth in Congestion Avoidance is too slow in those cases, which results in significant unused capacity. Many TCP variants have proposed more aggressive Congestion Window growth schemes for those scenarios, like TCP variants called STCP, HSTCP, BIC-TCP, H-TCP, CUBIC and TCP-Hybla, retaining loss-based congestion detection. Such variants are in general successful at improving TCP performance in high-speed/long-delay networks, but they do not solve the buffer-bloat problems, because they use loss-based congestion detection. In some cases, they may also have problems sharing a bandwidth bottleneck with less aggressive TCP variants, like standard Reno TCP, which can be overwhelmed by their more aggressive increase in Congestion Window.

Delay-Based Congestion Detection to Reduce Buffer-Bloat

There are TCP variants that detect network congestion by analyzing the connection's end-to-end delay through the measured Round-Trip Time (RTT), the time from sending a segment to receiving an acknowledgment for it. Some of such variants are TCP Vegas, TCP Vegas-A, TCP New Vegas, and FAST-TCP. The RTT measurements are sometimes translated into sending rate estimates, or into estimates of segments queued (buffered) in the transmission path, but in reality the independent variable they use to make decisions are RTT measurements.

In delay-based TCP variants, an increase in RTT is taken as a signal of the onset of congestion and, in Congestion Avoidance, the decision to increase or decrease the Congestion Window is made based on those RTT measurements. These methods generally succeed at reducing or eliminating congestion losses, thereby reducing the buffer-bloat and the excessive delay. However, they suffer heavily when competing against concurrent loss-based TCP variants. The reason is that delay-based TCP flows detect congestion earlier than loss-based TCP flows and reduce their sending rate accordingly. Loss-based variants do not have that restraint and keep increasing their sending rate until they fill up all intermediate bottleneck buffers, resulting in less and less capacity for the delay-based flows. Since the overwhelming majority of TCP in the Internet today uses loss-based congestion control, this has been a major obstacle for the adoption of pure delay-based variants.

Mixed Loss-Based and Delay-Based Variants

A very early proposal to use a mixed model, known as TCP-DUAL, adds to a loss-based Reno congestion control a congestion detection algorithm based on RTT measurements, which triggers a multiplicative decrease in Congestion Window. This approach can solve the buffer-bloat problems, but because of the RTT-based delay detection, like the above mentioned pure delay-based variants, it cannot compete against loss-based TCP variants.

Some other TCP variants, like Compound TCP, TCP Libra, TCP Africa, TCP Veno, YeAH-TCP and TCP Illinois, also use mixed models with loss-based and delay-based congestion control. The delay-based congestion detection is used to modulate the aggressiveness of Congestion Window growth, allowing more aggressive growth when no congestion is detected, which usually solves the performance problems associated to Reno/NewReno in high-speed/low-delay networks. However, in all these variants, when an RTT-based metric estimates that there is congestion, the Congestion Window will still keep growing, albeit more slowly, until packet losses arise, so buffer-bloat problems will persist, even when not competing with other data flows.

Another TCP variant called TCP Vegas+ is a mixed model using TCP Vegas by default, but switching to NewReno if a competing flow is detected. This should avoid buffer-bloat problems when there is no competition from other flows, but several unsolved Vegas problems remain, for example, low performance in high-speed/long-delay networks.

TCP Variants with Bandwidth or Rate Estimation

A TCP variant called Tri-S is an early TCP variant with rate-based congestion detection, using the time evolution of the transmission rate. However, without adequate filtering of the transmission rate estimates or without a statistical approach to testing the growth or stability of measured rate, the relatively large inherent variability in measured RTT spoils the congestion detection results. Moreover, a real-time rate-based congestion detection is not able to distinguish between a pure congestion situation and a situation in which the TCP flow is competing against a similarly aggressive TCP flow: in both situations the window will grow and the measured rate will stay constant. Since Tri-S reduces the Congestion Window upon congestion detection, it cannot compete against a TCP flow with loss-based congestion control, just like delay-based TCP variants.

TCP variants denoted as TCP-Westwood and TCP-Westwood+ introduced explicit bandwidth estimations into their congestion control mechanisms, based on a complex measurement of inter-acknowledgement timing or simply the rate of received acknowledgements. With appropriate filtering, those estimates at the time a congestion-induced loss happens are taken as the available bandwidth for the TCP connection. This bandwidth estimation, together with the minimum RTT measured, is then taken to determine the optimum Congestion Window. From there on, a Reno-like Congestion Avoidance mode will eventually take the Congestion Window size to congestion and packet losses (thus causing buffer-bloat), at which point a new optimum Congestion Window will be calculated based on a new bandwidth estimation.

There are also some more recent variants of TCP-Westwood aimed at high-speed/long-delay networks (such as LogWestwood+, TCPW-A, TCP-AR and TCP Fusion) with more aggressive window growth, which adapt better to changing network bandwidth, but which still suffer from buffer-bloat and may overwhelm concurrent, less-aggressive Reno flows.

Improved Transition from Slow-Start to Congestion Avoidance

The TCP variants described so far concentrate in the behaviour during the Congestion Avoidance phase. However, the transition from the Slow Start to Congestion Avoidance can be very important, especially in small downloads that spend a significant part of their existence in Slow Start. Detecting congestion in Slow Start only with losses may lead to severe buffer-bloat problems and packet losses, since congestion will be reached while the sending window is growing exponentially.

There are different approaches to detect congestion prior to packet losses in Slow Start and to then change into a less aggressive Congestion Avoidance algorithm. Some of them use measurements of inter-acknowledgement delays, which can be inaccurate because of the time-measurement precision and the sophisticated filtering required in the sender. TCP-Vegas proposes a modified Slow Start which in fact causes a premature Congestion Avoidance due to the burstiness of the Slow Start traffic. "Limited Slow start" is an experimental IETF RFC that relies on an arbitrary constant to determine the transition point. "Adaptive Start", being a part of the TCPW-A variant, uses the estimated bandwidth to derive the Slow Start Threshold parameter, and thus strongly depending on the quality of that estimate. "Hybrid Start", which is nowadays used by default in most versions of the wide-spread Linux operating system, uses two heuristic algorithms based on RTT measurements and inter-acknowledgement delays. This works well except when competing against concurrent TCP flows with congestion, because the concurrent traffic will increase the RTT from the beginning, and so the switch from Slow Start to Congestion Avoidance will occur too early, which will cause a decreased throughput.

Fairness and Competition Against More Aggressive TCP Flows Under Congestion

In much of the literature, the fairness problem is about how a more aggressive (with respect to congestion window growth) TCP variant avoids overwhelming a less aggressive one. However, it is equally important for a TCP flow to become more aggressive if it is determined that another TCP flow is competing with it in a more aggressive way. This can happen even if the other flow is from the same TCP variant, when that other flow is in the Slow Start. One of the few TCP variants addressing this issue is TCPW-A, which has a mechanism to increase the Slow Start threshold parameter if it is estimated that it would result in higher bandwidth, but it is conditioned by another mechanism to detect that there is no other TCP flow competing.

Network-Based Approaches

The TCP congestion control approaches mentioned so far rely on functionality implemented in end hosts, primarily on the sender side. However, some approaches rely on functionality in intermediate network nodes, like routers and switches, which could alert the endpoint about impending congestion (e.g. TCP ECN), or drop packets before congestion occurs (e.g. Random Early Detection queue management algorithms). A new active queue management algorithm, CoDel (K. Nichols, V. Jacobson, "Controlling queue delay", Communications of the ACM, vol. 55, no. 7, pp. 42-50, 2012) has recently been proposed to deal with buffer-bloat problems specifically, which also relies on part of the functionality being deployed in intermediate routers or switches. The problem with all these approaches is that they are very difficult to deploy, because there is an immense installed base of routers and switches that would have to support them along the end to end path. With host-based solutions, on the other hand, it is enough if the two hosts support the functionality, and if it is just a sender-side or a receiver-side functionality, only one of the end hosts needs to implement it to benefit from it.

Summarizing, buffer-bloat remains an important problem in TCP communications, causing unnecessary delays and resource usage, because the most widely used TCP variants utilize loss-based congestion detection, which at the same time prevents the use of delay-based variants that could mitigate the buffer-bloat problem. Almost all TCP-variants that use bandwidth-based and rate-based algorithms in determining the Congestion Window still use loss-based congestion detection, so buffer-bloat problems remain. In the few approaches where rate-based congestion detection is used to reduce the congestion window, measurement filtering and robust statistical methods are missing, so that the variability of measurements is not correctly addressed, and congestion is not well detected. In fact, as long as loss-based TCP variants are used (and nowadays they are the most widely used), buffer-bloat will be inevitable for any TCP flow that has to compete with them. However, there are many situations in which a connection does not compete with other connections over a capacity bottleneck, where buffer-bloat elimination would be very beneficial.

Moreover, commonly-used attempts to reduce buffer-bloat in the transition from Slow-Start to Congestion Avoidance based on delay metrics may be causing low throughput in the face of competition from other flows. In summary, the lack of a good mechanism for the detection of congestion and of competition is causing buffer-bloat problems in some cases and performance problems in other cases, when TCP flows do not react appropriately against competing concurrent TCP flows.

SUMMARY OF THE INVENTION

Based on the above summarized disadvantages of the prior art, it would be beneficial to provide a congestion control mechanism enabling efficient handling of congestion situations and of competition for bandwidth between concurrent flows, while avoiding buffer bloat.

This is achieved by the features of the independent claims.

Advantageous embodiments of the invention are subject matter of the dependent claims.

One approach of the present invention is to detect the congestion on the basis of the trends of both the flight size and the transmission rate in order to adapt the congestion window in accordance with the detection result.

Such approach has the advantage of reliable congestion detection and the possibility of distinguishing between congestion with unfair competition and congestion without unfair competition, situations which benefit from different treatment. The competition from a concurrent data flow is considered unfair when it steadily takes up more and more of a congestion-limited bandwidth. Moreover, the filtering applied in connection with determining the trend of transmission rate and/or flight size ensures that the decision on presence of the congestion is performed stably with respect to the temporal variations of the measurements.

According to a first aspect of the invention, a method is provided for congestion control in a data communication protocol employing acknowledged communication in which a transmitting node transmits data to a receiving node and the receiving node acknowledges receipt of the data, wherein a congestion window specifies a maximum amount of unacknowledged data which the transmitting node may transmit before reception of a positive acknowledgement for all or part of that data, the method to be performed by the transmitting node and comprising: measuring a flight size indicating an amount of data sent by the transmitting node and not yet acknowledged by the receiving node; measuring a transmission rate, the transmission rate corresponding to a same time instant as the flight size; determining a trend of the flight size; determining a trend of the transmission rate, wherein the trend is derived from a transmission rate gradient calculation, in which either the transmission rate measurements or the transmission rate gradient calculations or both, are filtered to reduce their temporal variability; detecting whether or not there is a congestion according to the determined trend of the transmission rate and the trend of the flight size; upon positive detection of the congestion, modifying the congestion window; and transmitting data while respecting the congestion window size.

According to another aspect of the invention, an apparatus is provided for controlling, in a transmitting node, congestion in a data communication protocol employing acknowledged communication in which the transmitting node transmits data to a receiving node and the receiving node acknowledges receipt of the data, wherein a congestion window specifies a maximum amount of unacknowledged data which the transmitting node may transmit before reception of a positive acknowledgement for all or part of that data, the apparatus comprising: a flight size measuring unit for measuring a flight size indicating an amount of data sent by the transmitting node and not yet acknowledged by the receiving node; a transmission rate measuring unit for measuring a transmission rate, the transmission rate corresponding to a same time instant as the flight size; a flight size trend calculation unit for determining a trend of the flight size; a transmission rate trend calculation unit for determining a trend of the transmission rate, wherein the trend is derived from a transmission rate gradient calculation, in which either the transmission rate measurements or the transmission rate gradient calculations or both, are filtered to reduce their temporal variability; a congestion detection unit for detecting whether or not there is congestion according to the determined trend of the transmission rate and the trend of the flight size; a congestion handling unit for, upon positive detection of the congestion by the congestion detection unit, modifying the congestion window; and a transmission unit for transmitting data while respecting the congestion window size.

BRIEF DESCRIPTION OF THE DRAWINGS

Exemplary embodiments of the methods and apparatus of the present invention are illustrated by way of example in the accompanying drawings in which like reference numbers indicate the same or similar elements and in which.

DETAILED DESCRIPTION

Figure 1A:
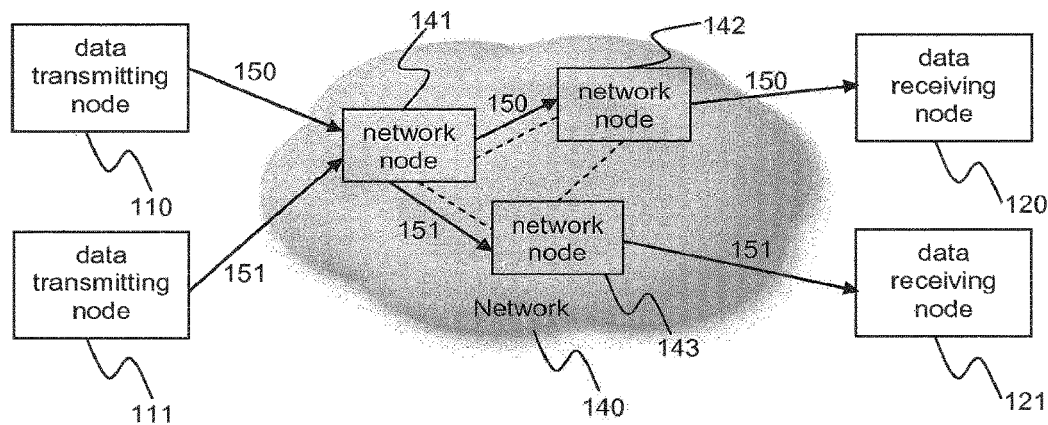
FIG. 1A is a block diagram illustrating communication over a network.

Efficient packet-switched communications require some buffering in network nodes to allow switching, to adapt different link rates and to absorb temporary transmission bursts. However, protocols using loss-based congestion control tend to use all the available buffers in the transmission path, beyond what is necessary for efficient communications, wasting memory resources and causing unnecessary delays, and resulting in buffer-bloat. Buffer-bloat may in fact be unavoidable in certain circumstances, as when competing against other communication data flows under congestion, since in those cases the flows that try to limit buffer-bloat will be overwhelmed by those that do not. However, buffer-bloat could be avoided when not competing against other data flows for congested resources (a fairly common situation).

The present invention provides methods and apparatuses for network congestion control that tackle the buffer-bloat problem when it can be avoided without penalizing throughput. It adds as a further advantageous feature an estimation of transmission rate and flight size trends, together with a congestion detection mechanism, that is robust against observed variability. Particular embodiments of the present invention specify further approaches to detect congestion using the measured trends of flight size and transmission rate, which enables distinguishing between different congestion situations. Thus, congestion situations with competing data flows with different perceived aggressiveness may be treated differently.

The present invention can readily be employed within the TCP protocol and some of the embodiments also envisage incorporation into the TCP congestion handling algorithms. Nevertheless, the present invention is in no way limited to employment in the TCP and is applicable to any communication protocols that provide acknowledged transmission and make use of congestion control, such as Stream Control Transmission Protocol (SCTP), Datagram Congestion Control Protocol (DCCP) or others. Moreover, the present invention is applicable at any protocol layer and not limited to the transport layer.

According to the present invention, both the flight size and the transmission rate are measured and used to determine their trends, with which it is determined whether or not there is a congestion situation. Based on the congestion detected, the strategy for modifying the transmission window size is selected.

The trend of the transmission rate is derived from its gradient. The gradient may be any metric that captures the trend. It can be, for example, the difference between two values measured at two points in time, or the difference between estimates (like the mean, the median, the exponentially weighted mean of a collection of measurements) at two points in time, an estimate of the slope of a curve fitted to a sequence of measurements, the (weighted) average of several consecutive gradient calculations or the metric from a trend estimation statistical test (like the well-known Jonckheere's trend test). In summary, the gradient can be any metric that can indicate if a sequence of values has an upward trend, a stable trend or a downward trend. In any case, this metric will be measured repeatedly, in real-time, starting from measurements which may potentially include very significant amounts of noise, especially in the case of the transmission rate measurements. Therefore, either the input transmission rate measurements, or the transmission rate gradient (trend metric) or both, are filtered to reduce the effects of noise, which could otherwise hinder the congestion detection.

Similarly, the trend of the flight size may be determined as any measure representing the evolution of the flight size or filtered flight size in time. In particular, a gradient as described above, may be used.

The present invention, embodied in methods and apparatuses, provides the possibility of competing with a loss-based TCP flow over a bottleneck, in which case it will tend to match the aggressiveness of competing flows, without overwhelming them. When not competing with "greedy" data flows over a bottleneck, it will tend to limit its congestion window once the transmission rate physical limit is reached, thus reducing buffer-bloat without compromising throughput. The approach is to measure, from the data sender's point of view, the flight size (i.e. the window being used) and the transmission rate attained with that flight size, then to determine their trends (time evolution) with statistically robust techniques, and finally to act upon the congestion window when it detects that the connection is in one of predefined congestion conditions. According to an advantageous embodiment, there are five such specific congestion conditions, described below. The invention is applicable to TCP senders (hosts), to which it adds the capability of detecting the aforementioned conditions and, upon the event of detecting one of those conditions, it appropriately changes the congestion window or the algorithm that controls the congestion window growth. In order to counter the large variability present in measurements, especially in transmission rate measurements, the present invention employs statistically robust techniques and filtering in the estimation of transmission rate trends.

The five specific conditions that may be detected and acted upon are: (1) congestion without unfair competition in Slow Start, (2) congestion without unfair competition in Congestion Avoidance, (3) congestion with unfair competition in Congestion Avoidance, (4) congestion with unfair competition after a congestion window reduction, and (5) congestion with unfair competition after a transition from Slow Start to Congestion Avoidance. It is noted that the present invention is not limited to evaluating all of the above conditions and to handling them appropriately. Rather, any of the above conditions may be distinguished by estimating the trend of flight size and transmission rate according to the invention. Thus, each of the above five conditions, their detection and handling constitute a separate embodiment. Moreover, these particular embodiments may be combined with each other as is clear to those skilled in the art.

Although the terms employed above for the conditions refer to terms "Slow Start" and "Congestion Avoidance", the invention is not limited to TCP and may be used for corresponding states (as defined in the above Background section or the corresponding TCP specifications) in other congestion control mechanism or apparatus. Moreover, the congestion state may be generally detected without distinguishing between congestion states such as Slow Start or Congestion Avoidance. Nevertheless, the distinction of the states further improves finer adaptation of the congestion control mechanism to the network conditions.

The term "unfair competition" is relative to the sending host that is performing the congestion detection and to its current state, i.e., it indicates that the competing data flow is more aggressive than the sending host in the current state. The term "more aggressive" means that the competing data flow increases its congestion window (or its transmission rate) at a faster rate than the sending host. Thus, a sending host may detect condition (1), i.e. congestion without unfair competition in Slow Start, when it is competing against another flow which is also in the TCP slow start state. Such competition will possibly not be considered as unfair, because it is just as aggressive as the sending host. However, if the sending host switches to Congestion Avoidance, it would start seeing the competing flow which remains in Slow Start as "unfair competition", since such flow would then appear more aggressive to the sending host.

The term "congestion" is also relative to the sending host, in the sense that it refers to the symptoms of congestion detected by the sending host according to certain data transmission parameters that are measured and evaluated. Congestion is thus considered to be positively detected if certain predetermined condition(s) based on the measured parameters is/are fulfilled. Advantageously, the measured parameters are flight size and transmission rate, together with their evolution evaluated over time (i.e. the trends) of those two parameters.

An embodiment of the present invention can (positively) detect condition (2), i.e. congestion without unfair competition in Congestion Avoidance state, by detecting a simultaneous increase in flight size and a stabilization in transmission rate. If condition (2) is positively detected, it is treated by reducing the congestion window. In the absence of Receiver Window or host buffer limits, the congestion window will govern the Send Window, which may then govern the flight size. Reducing the congestion window will therefore tend to reduce the flight size, which in turn will tend to mitigate buffer-bloat, Alternatively or in addition thereto, an embodiment of the present invention can (positively) detect condition (1), i.e. congestion without unfair competition in Slow Start, by detecting a simultaneous increase in flight size and a stabilization in transmission rate, which is treated by changing from the Slow Start to the Congestion Avoidance state. This will tend to make the flight size growth slower and, therefore, it tends to mitigate buffer-bloat.

If the distinction between the Slow Start and the Congestion Avoidance is not implemented, the positive detection of the congestion without unfair competition may still be performed by detecting the increase of the flight size and, at the same time, substantially unchanged transmission rate. The handling may consist in reducing the congestion window or reducing the speed of congestion window growth.

Also alternatively or in addition thereto, an embodiment of the present invention can detect condition (3), i.e. a congestion with unfair competition situation in Congestion Avoidance, in which there is congestion and there is another data flow competing for capacity bottleneck resources in a more aggressive way (such as by having its congestion window growing faster). Such congestion with unfair competition may be (positively) detected, in Congestion Avoidance (CA) state, by detecting a simultaneous increase in flight size and decrease in transmission rate. Positive detection of unfair competition in CA can be beneficially treated by either more aggressively increasing the Congestion Window or by switching from Congestion Avoidance to Slow Start.

In the absence of competing data flows, the rate-based congestion detection, like delay-based algorithms, can detect congestion when it occurs, normally much earlier than when congestion-induced losses occur, and buffer-bloat can be avoided by reducing the congestion window or transitioning from Slow Start to Congestion Avoidance at that point. One of the advantages of detecting congestion based on flight size and transmission rate evolution in time is that it allows distinguishing between congestion with unfair competition and congestion without unfair competition, especially in Congestion Avoidance. Accordingly, the action to take in each case may be quite different, which improves the effect of congestion handling.

If there is a competing flow using loss-based congestion detection, it is no longer possible to avoid buffer-bloat. If one of the flows limits its congestion window when congestion is detected (by the sender of that flow in its own way), then it will be overwhelmed by the loss-based competing data flow, which will keep increasing its flight size until all network buffers are full. In Congestion Avoidance, when the bottleneck capacity is reached, if the flow in parallel is growing more aggressively, the rate-based unfair-competition detection according to the embodiment described above, will detect a decreasing transmission rate with an increasing flight size, and the congestion window will either be increased or switched to a more aggressive algorithm, such as Slow Start. Those two actions will make the data flow more aggressive and help it compete better against the more aggressive flow.

When congestion is detected by a host (by the methods or elements of the present invention, or by other algorithms, like delay-based mechanisms or by the receipt of three duplicate acknowledgements), it may happen that in addition to the congestion situation, one or more data flows are competing for the available bandwidth, with a similarly aggressive window growth rate. Up to that point, the similarly aggressive flows could have been sharing the congested bottleneck with a roughly constant transmission rate, while their respective flight sizes kept rising in parallel (using the available network buffering). When, as a result of the congestion detection, either the congestion window is reduced or the connection in Slow Start is switched to Congestion Avoidance, the now less aggressive flow will lose some transmission rate, which will be taken up by its competing data flows. This situation is therefore called "unfair competition" in this description, since from the point of view of the data flow reducing its aggressiveness it is unfair. This congestion with an unfair competition situation can be detected by the sending side a posteriori, evaluating the immediate results of lowering the congestion window or switching to Congestion Avoidance.

An embodiment of the invention can positively detect "congestion with unfair competition" after a congestion window reduction (i.e. condition (4) mentioned above) when, a short time after reducing the congestion window (following the positive detection of congestion), the flight size is not smaller than the amount of reduction in the congestion window, while at the same time, the transmission rate is lower. Upon detection of this condition (4), the congestion window reduction may beneficially be undone, i.e. reversed. For example, if a competing data flow is growing its congestion window at the same rate, in Congestion Avoidance, the above-described rate-based detection of congestion without unfair competition (2) eventually positively detects congestion and reduces the congestion window, which will slow down the data flow that has reduced its congestion window, because the other data flow will fill up the buffering that has been given up. However, according to the embodiment handling condition (4), this transmission rate reduction can be detected and congestion window reduction reversed, with the value that had been deducted added back to the congestion window.

Alternatively or in addition thereto, an embodiment of the present invention can positively detect "congestion with unfair competition" after a transition from Slow Start to Congestion Avoidance (corresponding to condition (5) mentioned above) when, a short time after switching from Slow Start to Congestion Avoidance (following the detection of congestion), the flight size is not smaller and there is a reduction in transmission rate after the transition from Slow Start to Congestion Avoidance. If this condition (5) is detected, the connection may beneficially be switched back to Slow Start. In this way, the detection to validate the transition from Slow Start to Congestion Avoidance is able to determine that there is a reduction in transmission rate if there is a competing loss-based flow in Slow Start, in which case the flow would go back to Slow Start. In the latter case, since the Slow Start algorithm grows very fast, it may be beneficial to temporarily maintain a variable with the value indicating the size that the congestion window would have reached if the switch to congestion avoidance had not happened. Accordingly, if switching back to Slow Start is required, the congestion window can be set to the value stored in that variable.

Incorporating the invention to an existing TCP implementation, with its capability to detect the five above described conditions and their associated actions, may produce a TCP implementation that solves the buffer-bloat problem. However, some TCP implementations may benefit from incorporating just a subset of those five condition detection capabilities (and associated actions). The same applies for congestion control mechanisms of other protocols which may be also implemented on other layers than the transport layer.

Figure 1B:
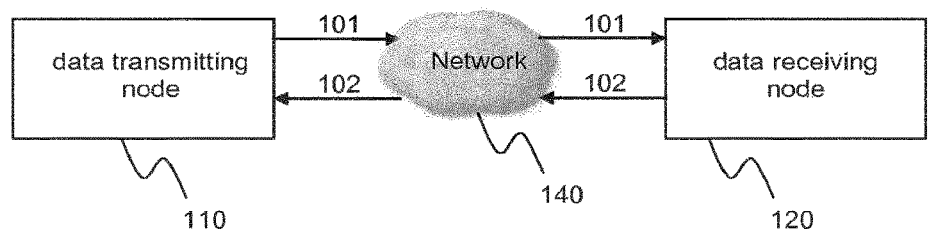
FIG. 1B is a block diagram illustrating an acknowledged communication between two network nodes.
Figure 1C:
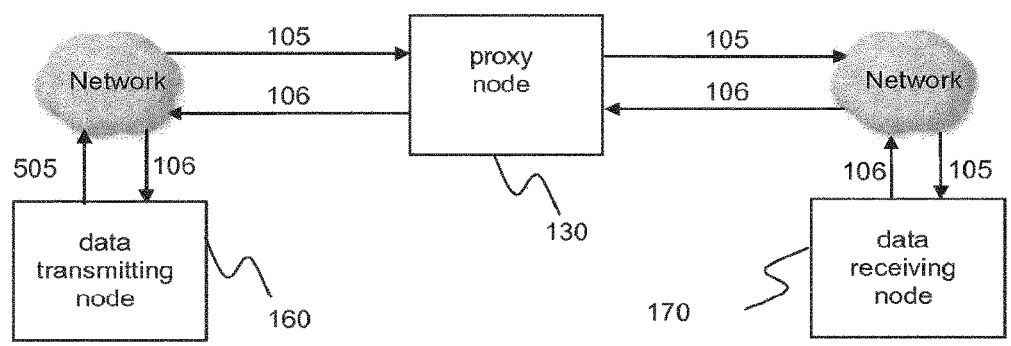
FIG. 1C is a block diagram illustrating an acknowledged communication between two network nodes interconnected via a proxy node.

The methods of this invention can be implemented, among other possibilities, as an addition to the TCP functionality of an end host of a TCP connection, or as an addition to the TCP functionality of a TCP proxy as shown in FIG. 1C. A TCP proxy node 130 is a network node that acts as an intermediate node between two end hosts 160 and 170 communicating via TCP. The TCP proxy 130 terminates the TCP connection towards the two end hosts, in a transparent way with respect to the end hosts 160, 170. This kind of proxy node 130 can relay the information sent from one end host to another end host (105 and 106 in FIG. 1C) transparently or may try to add value by modifying it in some way. Similarly, the methods of this invention could be applied to other protocols apart from TCP where a proxy node may also be used. Embodying the present invention within a proxy node 130 provides may be beneficial since the configuration or implementation of the end hosts 160 and 170 does not need to be changed in order to benefit from the advantages of the present invention.

It is noted that TCP includes many aspects beyond congestion control. Those other aspects do not need to be changed by the present invention. This invention may thus be easily adapted to an existing TCP implementation with loss-based congestion detection, adding certain steps at a point in the processing that will be specified below.

Figure 2:
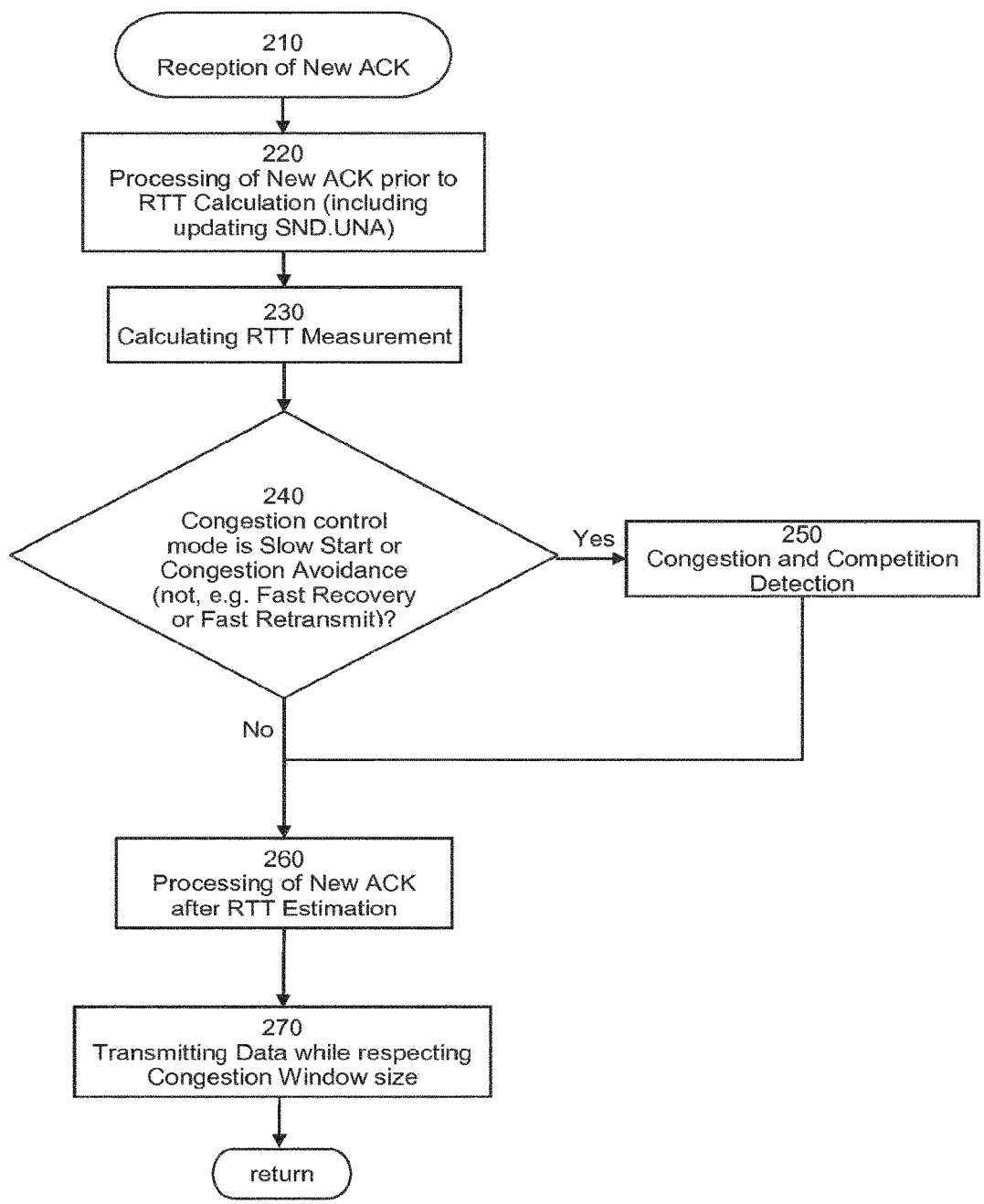
FIG. 2 is a flow diagram illustrating steps being invoked when processing an incoming acknowledgement segment, illustrating how an embodiment of the invention can be fitted into an existing TCP implementation.

FIG. 2 is a flow chart illustrating processing logic performed upon reception 210 of new acknowledgement segment (new ACK) according to an embodiment of the present invention.

It also indicates how an embodiment of the present invention can be fitted into an existing TCP implementation. A "new ACK" refers to an ACK segment which cumulatively acknowledges TCP user data previously sent by the destination host of this new ACK segment for the first time (i.e. that said data has not been cumulatively acknowledged before). It is noted that even when it is beneficial to perform the method after each reception of a new ACK, the present invention is not limited to such implementation. In general, the invention may be implemented performing the method less frequently than for each new ACK reception. It could even be performed not when new a new ACK is received, but periodically according to an internal clock, which would still allow it to estimate transmission rates.

Apart from the source port, destination port, sequence number, window size and checksum, TCP protocol header further includes, inter alia, flags such as ACK (indicating significance of the acknowledgement field), FIN (no more data from sender), SYN (synchronize sequence number, only set for the first packet), RST (reset of the connection) and others (described in detail in the above cited RFC 793). In a TCP implementation, a new ACK is a valid TCP segment characterized by having the ACK flag set in the TCP header and by not having any of the FIN, SYN and RST TCP header flags set. Step 220 refers to processing for a new ACK segment that a TCP protocol (or another protocol) may perform, as described before, up to the estimation of RTT. In general, step 220 may include reading the segment from a network interface, decoding its data-layer and network-layer headers, verifying whether the segment is a correctly formed TCP segment, etc. The term "SND.UNA" in step 220 refers to a TCP connection state parameter, namely, to the sequence number of the lowest byte not yet cumulatively acknowledged, which is updated with the acknowledgement sequence in the new ACK message received. The parameter cwnd denotes the congestion window size in bytes. As part of that logic, a TCP host usually calculates (step 230) the RTT. RTT is the Round-Trip Time: the time since a certain TCP segment is sent until the first acknowledgement segment is received that acknowledges the sent segment and estimates the end to end round-trip delay between the communicating hosts.

It is after step 230 in which RTT is calculated that the Congestion and Competition Detection steps 250 are performed. These steps are only performed, if the TCP congestion control is in Slow Start or Congestion Avoidance (or an equivalent of these modes), but not in the Fast Recovery or Fast Retransmit modes. This is illustrated by a decision step 240. In some TCP implementations RTT is not necessarily calculated for all new acknowledgements (ACKs). Nevertheless, also in such case, the congestion and competition detection may be performed in the same step 250, and may use the most recent RTT value obtained from a previous (e.g. most recent) new ACK, for which the RTT was calculated. In the embodiments presented, it is assumed that SND.UNA is set in Step 220, before the congestion and competition Detection 250. However, SND.UNA could be also set after step 250, in which case step 250 will use the acknowledgement sequence in the New ACK instead of SND.UNA.

Step 260 includes all remaining processing logic required for a new ACK by a TCP implementation. Such processing is not part of the present invention and is also not required thereby. The way in which the TCP processing of new ACK is split between steps 220 and 260 does not influence the invention: any of the steps 220 or 260 may include, for example, updating TCP-related counters or increasing the Congestion Window according to a Congestion Avoidance or Slow Start algorithm. Step 270, Transmitting Data while respecting the Congestion Window size, includes evaluating the Send Window (as a function of the Congestion Window, the Received Window and output buffer limits in the sending host), and then sending out TCP segments whose end sequence number is lower than the sum of SND.UNA and the Send Window. These segments would come from the queue of TCP segments waiting to be transmitted in the direction opposite to that of the received new ACK. A part of the new ACK processing after RTT estimation 260 could alternatively be performed after step 270.

The congestion control implementation may already include a method to determine the transition from Slow Start to Congestion Avoidance before losses occur, i.e. a method for setting the value of the Slow Start Threshold (ssthresh) to that of the current Congestion Window during Slow Start, as a function of measurements during that same Slow Start phase. In such case, the whole of that existing method, which will normally be invoked upon receipt of a new ACK segment, may be replaced by the corresponding steps for congestion detection in Slow Start according to an embodiment of the invention.

As explained above, the congestion detection is based on measuring a transmission rate and a flight size. The transmission rate may be either the sending rate or the acknowledgement rate. Sending Rate is the rate at which new TCP user data is being sent. Acknowledgement Rate is the rate at which TCP user data is being acknowledged.

Additionally, when sending a TCP segment (i.e. a TCP packet) which includes new user data, if the acknowledgement rate is used as transmission rate, the sequence number and the SND.UNA value are preferably recorded at the time of sending the segment, so that when an acknowledgement for the sent data is received, the recorded SND.UNA value can be read, indicating the value of SND.UNA at the time when the acknowledged data was sent. This value can be recorded for all new data segments being sent or just for a subset of them, but in the latter case, precision in calculating the acknowledgement rate would be lost.

Figure 3:
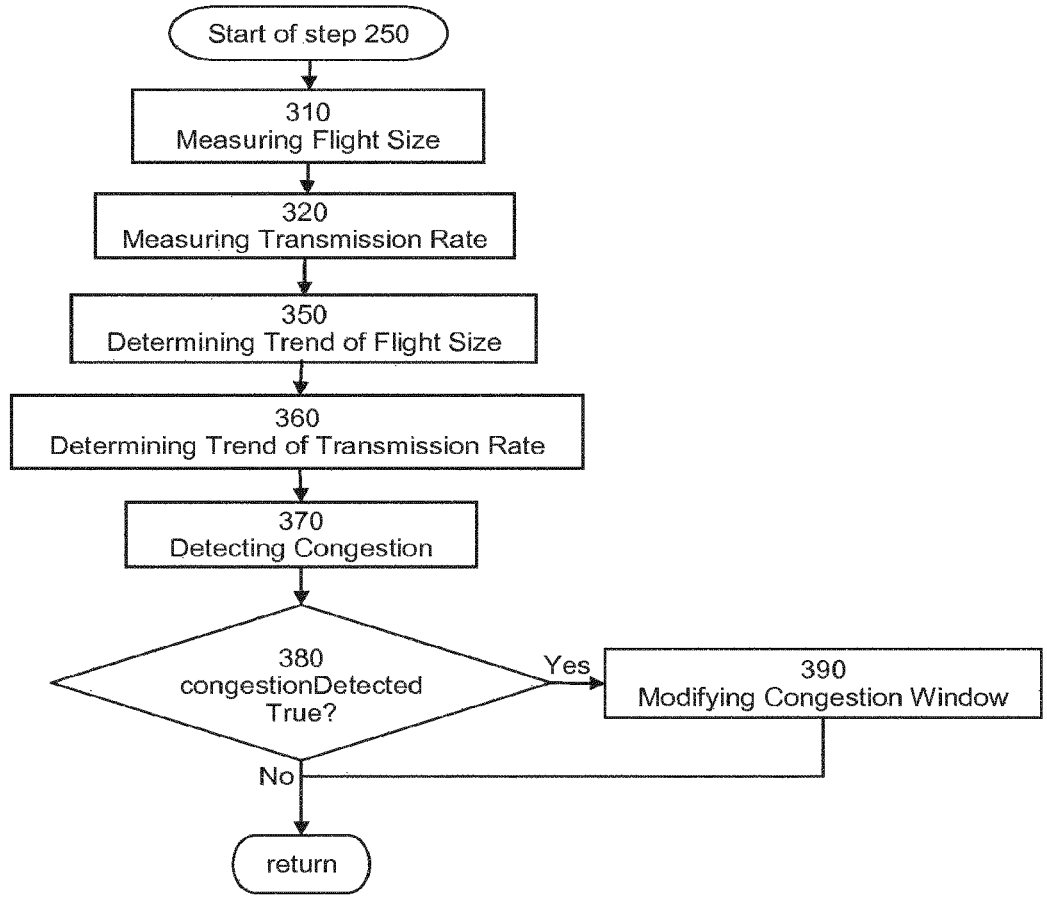
FIG. 3 is a flow diagram illustrating the main steps of a possible embodiment of the methods of this invention, including just one of the five detection steps of the invention.

FIG. 3 shows one possible embodiment of the methods of the invention, implementing any one of the five possible congestion detection steps (with their respective associated actions). In particular, a method is provided for congestion control in a communication protocol employing acknowledged communication in which a transmitting node transmits data to a receiving node and the receiving node acknowledges receipt of the data, wherein a congestion window specifies a maximum amount of unacknowledged data which the transmitting node may transmit before reception of a positive acknowledgement for all or part of that data. The method includes measuring 310 a flight size indicating an amount of data sent by the transmitting node and not yet acknowledged by the receiving node; measuring 320 a transmission rate, the transmission rate corresponding to a same time instant as the flight size; determining 350 a trend of the flight size; determining 360 a trend of the transmission rate; and judging 370 whether or not there is a congestion according to the determined trend of the transmission rate and the trend of the flight size. If in the judging step 370 (detection step), the congestion was positively detected, the step of modifying the congestion window 390 follows. The data to be transmitted are then transmitted in step 270, while respecting the congestion window size. In the context of FIG. 2, FIG. 3 shows a possible implementation of the congestion and competition detection step 250 to be executed as part of the processing of a new ACK, after the calculation 230 of RTT.

In addition to the steps included in FIG. 3, there is one more step that is executed after the steps described in FIG. 3 (see FIG. 2), namely the transmission of the data while respecting the congestion window size 270, already described above. The first two steps of the embodiment of FIG. 3 are: Measuring Flight Size 310 and Measuring Transmission Rate 320.

The step of Measuring Flight Size 310 obtains the flight size further used for detecting the congestion and possibly for distinguishing between the congestion with and without unfair competition. The flight size may be measured (calculated) as follows. If using the sending rate for the data transmission rate, an appropriate sample of the Flight Size can be obtained by subtracting SND.UNA from SND.NXT at the time the new ACK is being processed. As a final result of processing a New ACK, normally new segments will be sent. Thus, instead of SND.NXT, it would be possible to use an estimate of what SND.NXT will be once those new segments have been sent out. SND.NXT is a TCP connection state parameter, the first sequence number of the next unsent segment.

If using the acknowledgement rate as the data transmission rate, Flight Size is to be estimated at the time when the segment being acknowledged was sent. In order to enable such estimation, the implementation of the invention may keep a record of (i.e. store) the SND.UNA parameter at the time the respective segments are sent, for all sent unacknowledged segments, or for a subset of them. Then, a sample of the number of bytes sent but not yet acknowledged can be obtained by subtracting SND.UNA stored at the time when the last segment being acknowledged was sent from SND.UNA at the time of processing the new ACK. Alternatively, in order to obtain the most correct estimate, instead of using the SND.UNA (stored) at the time the last segment being acknowledged was sent, the SND.UNA at the time the first segment that is being acknowledged was sent is used for the calculation (which can be different from the last segment being acknowledged, especially when using delayed acknowledgements). Furthermore, it may be advantageous when storing the SND.UNA parameter at the time segments are sent, when several segments are sent consecutively as a response to a received ACK segment, as a burst, to also store how many consecutive segments are being sent, so that when calculating the flight size, the same flight size can be assigned to the acknowledgement of any of the segments sent out as a burst, namely the flight size that would correspond to the last segment sent as part of the burst.

Alternatively, the Congestion Window parameter cwnd itself can be used as an estimate of the flight size, which would produce results similar to using the acknowledgement rate. However, when the flight size is being limited by the window advertised by the receiving side or by buffer limitations in the sender's stack, the Congestion Window may be a rather inaccurate representation of the flight size.

The measured transmission rate may be calculated in step 320 as the above calculated flight size divided by the measured RTT. Depending on which Flight Size is used, the data sending rate or the acknowledgement rate is obtained. Using the data acknowledgement rate yields better results in congestion and unfair competition detection, because it is a better reflection of the end-to-end transmission rate and because it is a less noisy measurement, but it may also be more computationally and memory-intensive. Thus, both options may be used for implementing the invention. In stable situations, without significant losses, due to the acknowledgement "clocking" inherent in TCP and to the fact that only what has been sent can be acknowledged, the sending rate and the acknowledgement rate are very similar. However, when there are fast variations in transmission rate, as in Slow Start, the sending rate may be quite different from the acknowledgement rate. In this situation, using the acknowledgement rate would likely produce better results for Slow Start Congestion Detection than applying the sending rate. Since in general using the acknowledgement rate produces the best results, the embodiments described use the acknowledgement rate and its corresponding flight size, but it would be straightforward to modify them to use the sending rate changing the flight size estimation as described above.

According to the embodiment described in FIG. 3, after measuring the flight size and the transmission rate (steps 310 and 320), the evolution in time, i.e. the trend, of both the flight size and of the transmission rate may be determined (steps 350 and 360).

Figure 7:
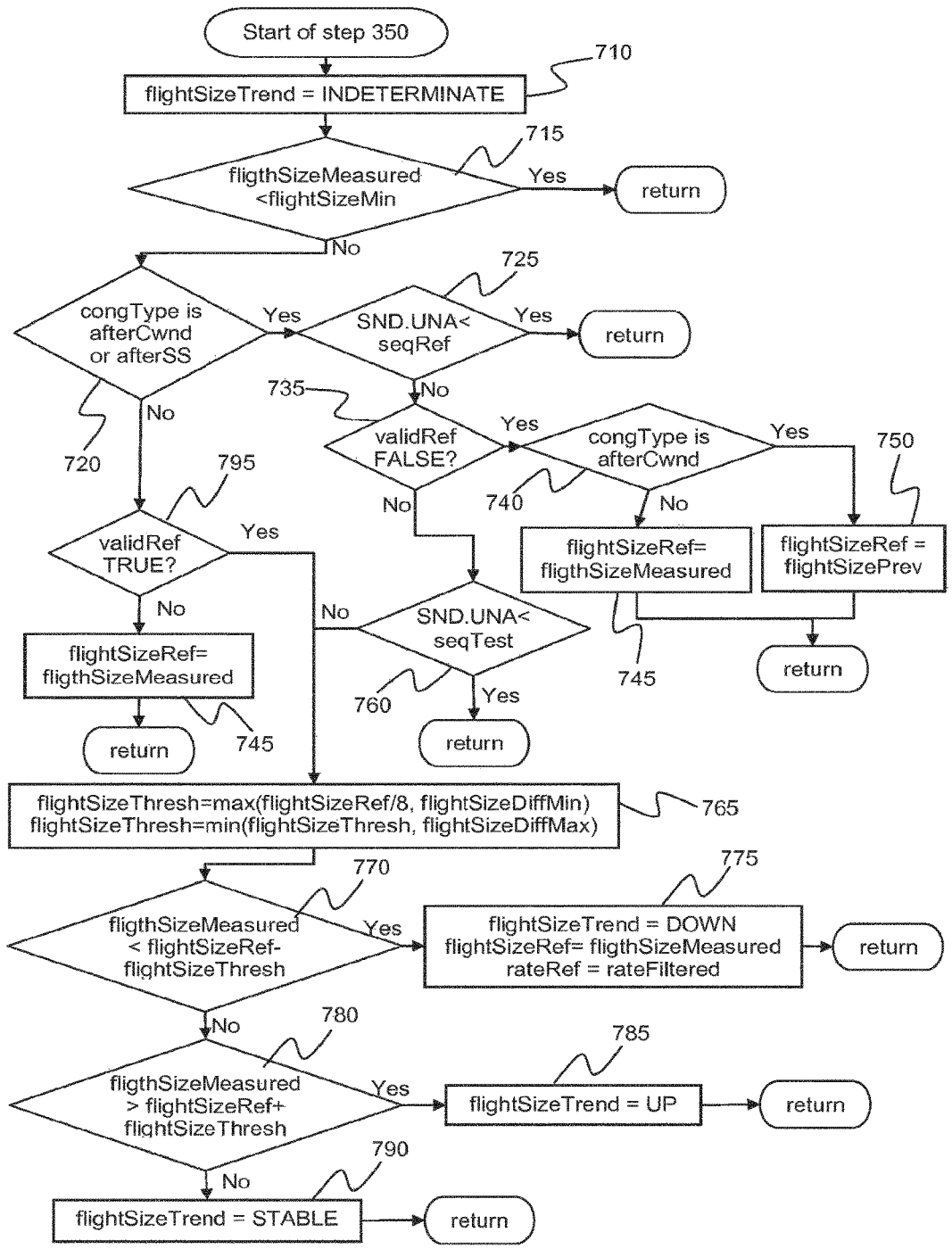
FIG. 7 is a flow diagram illustrating the main steps of an embodiment of the step for determining the trend of the flight size.

FIG. 7 illustrates a possible implementation of the determination of the trend in the flight size (step 350). In this figure, flightSizeTrend represents a variable that may be assigned the following values: "INDETERMINATE", "UP", "DOWN" and "STABLE", and is initially set to a default value of "INDETERMINATE" in step 710. The flightSizeMeasured variable stores the measured value from step 310, and if it is less than a configurable value flightSizeMin in step 715, the flight size trend estimation procedure is left (with flightSizeTrend set to "INDETERMINATE"). FlightSizeMin may be set to a value below which it may not be advantageous to determine the trend or to detect congestion, for example 20*MSS. MSS stands for maximum segment size, corresponding to the largest amount of data (usually in octets/bytes), which can be transmitted or received in a single TCP segment (i.e. within the TCP payload).

The variable congType, used in FIG. 7 and several other figures of the exemplary embodiments, represents the type of congestion that is being detected, and may have the values: "congSS" (for detection of congestion without unfair competition in Slow Start), "congNoUnfair" (for detection of congestion without unfair competition in Congestion Avoidance), "congUnfair" (for detection of congestion with unfair competition in Congestion Avoidance), "afterSS" (for detection of congestion with unfair competition after switching from Slow Start to Congestion Avoidance) and "afterCwnd" (for detection of congestion with unfair competition after reducing the congestion window due to a congestion detection in Congestion Avoidance). In the embodiment illustrated by FIG. 3, it is assumed that congType is already set to one of its possible values, reflecting the type of congestion to be detected. It is noted that the present invention can also be implemented for only one of the above types of congestion, in which case only the presence/absence of that particular congestion type would be detected. In the embodiment illustrated by FIG. 4, in which the five types of congestion detection are used in a coordinated way, it is assumed that congType is initially set to "congSS" when the connection starts in Slow Start, and then it is appropriately changed to other values, according to the current state of the network.

In FIG. 7, which illustrates an embodiment of step 350, it is assumed that congType is already set. If it is set to either "afterCwnd" or "afterSS" in step 720, it will then compare the SND.UNA value with the seqRef variable in step 725, which stores the sequence number of the next unsent contiguous segment at the time a congestion was detected and either the congestion window was thereby reduced or the congestion control state was thereby switched from Slow Start to Congestion Avoidance. If SND.UNA is lower than seqRef, the flight size trend estimation procedure is left (with flightSizeTrend set to "INDETERMINATE"). If SND.UNA is not lower than seqRef, step 735 checks the value of validRef, a variable that indicates whether or not a valid reference value has already been chosen as reference for the trend estimation. If validRef is "FALSE" and congType is verified in step 740 to be "afterCwnd", then, in step 750, the flightSizeRef variable (the flight size value to be used as reference for the trend estimation) will be set to the value stored in flightSizePrev, i.e., to the flightSizeMeasured value right before the congestion detection indicated by seqRef. It is assumed that flightSizePrev has the measured flight size value prior to the currently measured flight size value, and that value should have been store in step 310 right before updating the flightSizeMeasured variable. If congType in step 740 is not "afterCwnd" (i.e. if it is "afterSS"), then, in step 745, the flightSizeRef variable will be set to the current flightSizeMeasured value. After both steps 745 and 750, the flight size trend estimation procedure is left (with flightSizeTrend set to "INDETERMINATE"). If in step 735 validRef is "TRUE" (i.e. there is a valid reference flight size for trend determination), but SND.UNA is less than seqTest in step 760, the flight size trend estimation procedure is also left (with flightSizeTrend set to "INDETERMINATE"). seqTest is a variable storing a sequence number after which the trend determination will be performed in case congType is either "afterCwnd" and "afterSS".

If in step 720 congType is not "afterCwnd" or "afterSS", validRef is evaluated in step 795, and if varidRef is not TRUE, then the flightSizeRef variable will be set to the current flightSizeMeasured value in step 745 and the flight size trend estimation procedure is left (with flightSizeTrend set to "INDETERMINATE").

If in step 760 SND.UNA is not lower than seqTest, or if in step 795 validRef is TRUE, then step 765 will be performed, to calculate the variable flightSizeThresh, which stores a threshold value based on which the trend in flight size will be determined, measured in bytes in this particular implementation. This threshold value may be calculated as a fixed ratio of the reference flight size (stored in flightSizeRef), with ⅛ being an appropriate value, also because a division by 8 can be performed as a binary record shift. The resulting value can then be clamped between a minimum value, flightsizeDiffMin (5*MSS, for example, would be appropriate), and a maximum value, flightsizeDiffMax (15*MSS, for example, would be appropriate), Step 770 checks whether the current value of the flight size is lower than its reference value by more than the threshold calculated above, and if it is, in step 775, the variable flightSizeTrend is set to "DOWN" and the current values are taken as new reference values for both the flight size (stored in flightSizeRef) and for the transmission rate (stored in the rateRef variable). The rateRef variable is analogous to the fligthSizeRef variable, but used for the transmission rate reference value, which is used in step 360 to calculate the trend of the transmission rate. If step 770 determines that the flight size is not lower than its reference value by more than the threshold calculated above, then step 780 checks whether the current value of the flight size is higher than its reference value by more than that same threshold, and if it is, in step 780, the variable flightSizeTrend is set to "UP". Finally, if step 780 determines that the current value of the flight size is not higher than its reference value by more than the aforementioned threshold, then the variable flightSizeTrend is set to "STABLE" in step 790. After any of steps 775, 785 and 790, the flight size trend estimation procedure is left (with flightSizeTrend set to its determined value, indicating either "UP" meaning increasing flight size trend or "DOWN" meaning decreasing flight size trend or "STABLE" meaning stable, i.e. substantially unchanged, flight size trend). The trend determined in this way may be further used in step 370 for detecting the congestion.

Figure 8:
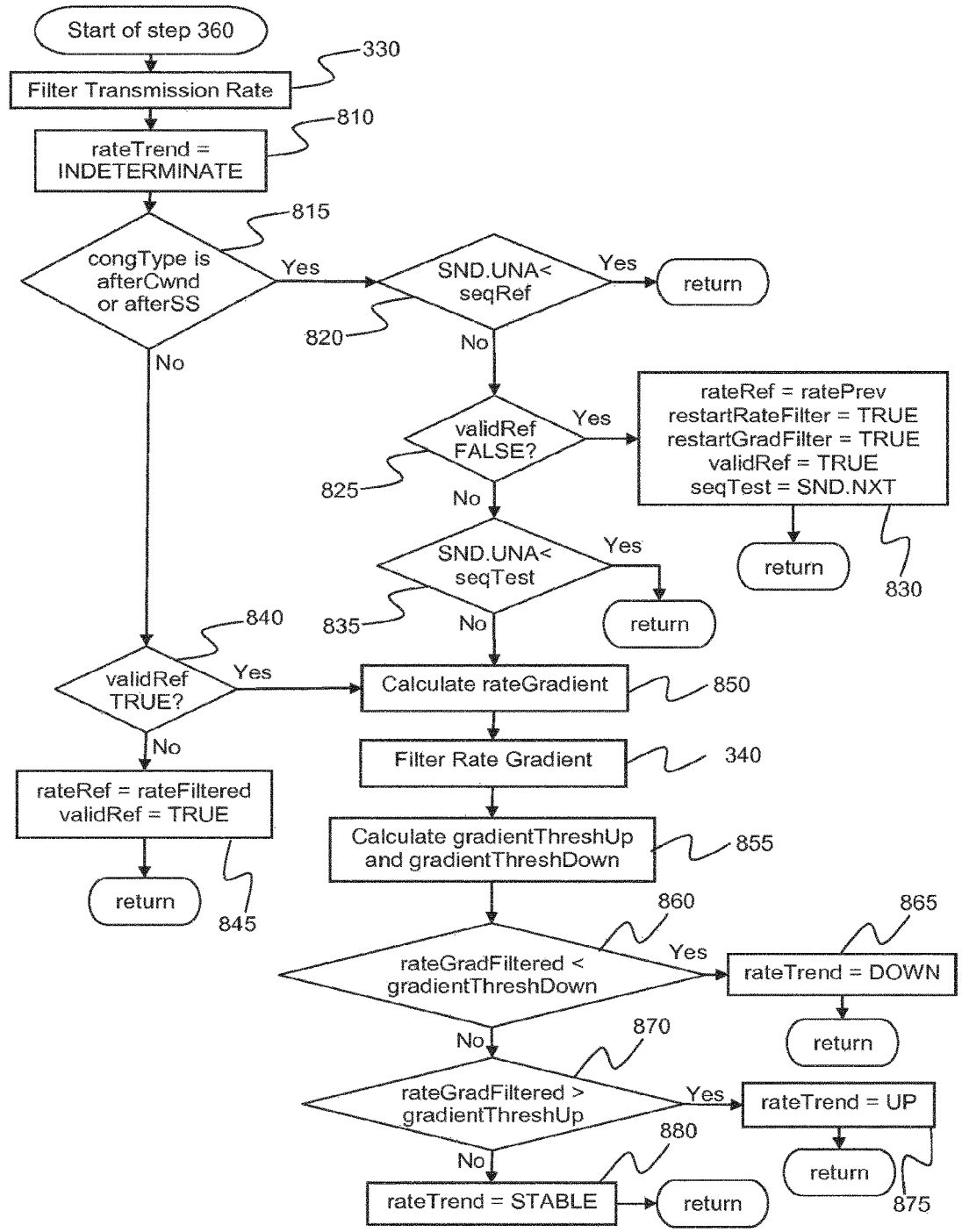
FIG. 8 is a flow diagram illustrating the main steps of an embodiment of the step for determining the trend of the transmission rate.

FIG. 8 illustrates a possible implementation of the determination of the trend in the transmission rate (step 360). The first step, step 330 Filter Transmission Rate, is optional only if step 340 Filter Rate Gradient is performed (i.e. either step 330 or step 340, or both, must be implemented, to counter the variability in measured Transmission Rate). Which filtering step is used will depend on which metric is used for the transmission rate gradient. The Transmission Rate (both the sending and the acknowledgement rate) can exhibit large variability, making it advisable to filter it to remove noise from that measurement, unless the filtering is performed on the calculated gradient. A widely used and computationally efficient low-pass filter is a basic average estimator of the class called recursive prediction error algorithms, also called Exponentially Weighted Moving Average (EWMA). The filtered transmission rate is updated to a new value (RFn) as a function of the previous value RFn−1, the new measurement Rmeasured and a smoothing parameter g:

$$RFn=(1-g) \cdot RFn-1+g \cdot Rmeasured=RFn-1+g \cdot (Rmeasured-RFn-1)$$

The sign "·" means multiplication, which is in Figures also denoted as "*". For example, value of 1/16 is an appropriate value for g when samples are obtained for every reception of a new ACK, but a higher value may be beneficial for less frequent samples. Nevertheless, the present invention is not limited to such values. Rather, a value may be selected which results in a most robust congestion control mechanism by testing. Other filtering algorithms could also be used, such as second degree low-pass filters.

Figure 5:
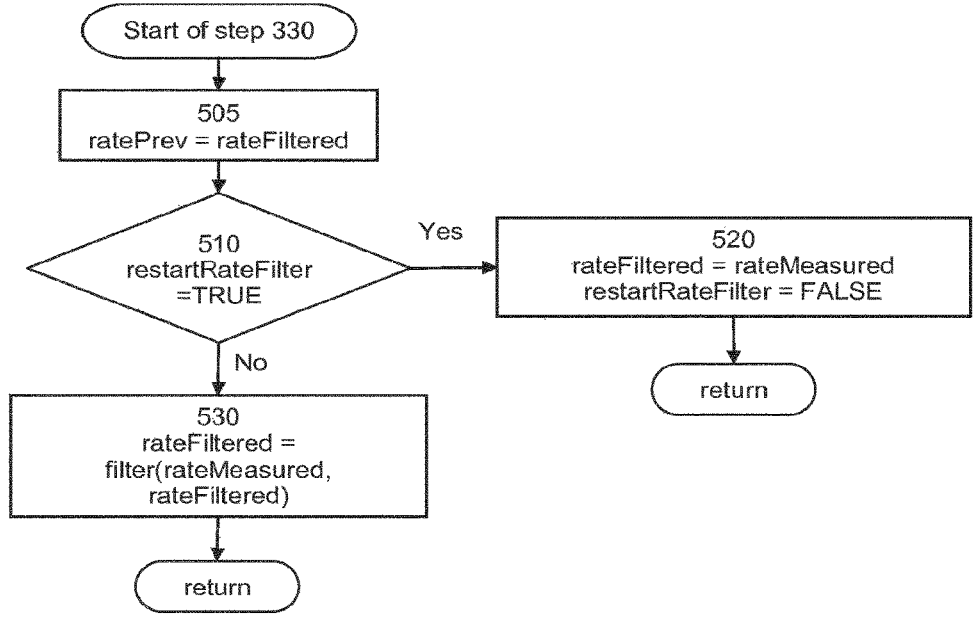
FIG. 5 is a flow diagram illustrating the main steps of an embodiment of the data transmission rate filtering step.

An exemplary implementation of the main steps of Transmission Rate filtering 330 is illustrated in FIG. 5, where the first step, 505, is to store a copy of the current value of rateFiltered in ratePrev, before rateFiltered is updated. In FIG. 5, rateFilterRestart represents a variable that may have either value "True" or "False". The variable rateMeasured is a variable that stores the transmission rate previously measured in step 320. The variable rateFiltered stores the result from filtering the transmission rate measurements. If the value of restartRateFilter is true in step 510, the filtering is reset by setting rateFiltered to rateMeasured and setting restartRateFilter to False in step 520. Otherwise (if restartRateFilter is false) the variable rateFiltered is updated in step 530 as follows:

$$rateFiltered=rateFiltered+g \cdot (rateMeasured-rateFiltered)$$

It is noted that the implementation of the filtering described above is only an advantageous example. However, the present invention is in no way limited to this particular implementation. For the purpose of the present invention, any kind of filtering may be applied, including for instance any (weighted) average filtering or any low-pass filtering.

Back to FIG. 8, rateTrend represents a variable that may be assigned the following values: "INDETERMINATE", "UP", "DOWN" and "STABLE", and is initially set to a default value of "INDETERMINATE" in step 810. The rateFiltered variable stores the filtered value of the transmission rate in step 330 (or the measured value from step 320 if no filtering is used). After step 810, if congType is set to either "afterCwnd" or "afterSS" in step 815, step 820 compares the SND.UNA value with the seqRef variable. If SND.UNA is lower than seqRef, the transmission rate trend estimation procedure is left (with rateTrend set to "INDETERMINATE"). If SND.UNA is not lower than seqRef, step 825 checks the value of validRef. If validRef is "FALSE" then, in step 830, the rateRef variable (the transmission rate value to be used as reference for the trend estimation) will be set to the value stored in ratePrev, i.e., to the rateFiltered value right before the congestion detection indicated by seqRef. It is assumed that ratePrev stores the previous filtered rate value, if using step 330 to filter rate measurements, or the previous rate measurement if not using step 330 to filter rate measurements (in which case, the ratePrev variable should be updated right before step 320 collects a new rateMeasured value). Additionally, in step 830, the restartRateFilter and restartGradFilter variables will be set to TRUE, as a way to re-start the filtering once the reference transmission rate has been chosen for trend estimation; the validRef variable, will be set to "True" to indicate that both the transmission rate and flight size reference values are taken, and the SND.NXT parameter will be stored in the seqTest variable, since that is the sequence value at which the trend calculation will be performed when congType is either "afterCwnd" and "afterSS". After step 830, the transmission rate trend estimation procedure is left (with rateTrend set to "INDETERMINATE"). If in step 825 validRef is "TRUE" (i.e. there is a valid reference transmission rate for trend determination), but SND.UNA is less than seqTest in step 835, the transmission rate trend estimation procedure is also left (with rateTrend set to "INDETERMINATE").

If in step 815 congType is not "afterCwnd" or "afterSS", validRef is evaluated in step 840, and if varidRef is not TRUE, then the rateRef variable will be set to the current rateFiltered value in step 845, while the validRef variable will be set to "True" to indicate that both the transmission rate and flight size reference values are taken, and the transmission rate trend estimation procedure is left (with flightSizeTrend set to "INDETERMINATE").

If in step 835 SND.UNA is not lower than seqTest, or if in step 840 validRef is TRUE, then step 850 will calculate the transmission rate gradient and store it in the rateGradient variable. After step 850, step 340, Filter Rate Gradient, may be performed (the internal details of step 340 will be described later on). As discussed earlier, either step 330 or step 340, or both, must be implemented, to counter the variability in measured Transmission Rate. After step 340 (or step 850 if Transmission Rate Filtering is not performed), step 855 will calculate the variables gradientThreshUp and gradientThreshDown, which store threshold values based on which the trend in transmission rate will be determined. The transmission rate gradient in step 850 may be calculated in different ways and this will influence how it is filtered in step 340 and the calculation of threshold for trend determination in step 855.

One alternative to calculate the gradient in transmission rate is as the difference between the current transmission rate (rateFiltered if using step 330 to filter transmission rate, rateMeasured otherwise) and the reference value (rateRef), i.e.

$$rateGradient = rateFiltered - rateRef$$

This alternative is especially advantageous in the case of one-off trend calculations, such as in the case where congType is "afterCwnd" or "afterSS", where the objective is to see if the transmission rate has decreased after a specific event (the event may be a switch from Slow Start to Congestion Avoidance or a congestion window reduction due to a previous congestion detection).

When calculating the gradient as the difference between the current rate and a reference rate, filtering can be performed directly on the transmission rate (via step 330) or on the rateGradient variable in step 340, but better results should be obtained when filtering at step 330, since the filtering would be performed even when SND.UNA is lower that seqTest. In this case, the threshold value for upward trend determination, gradientThreshUp, may be calculated as a fraction (e.g. ½) of the ratio of the threshold flight size to the reference flight size (i.e. flightSizeThresh/flightSizeRef), applied to the reference transmission rate (stored in rateRef). The resulting value can then be forced to be smaller than a certain ratio of the reference transmission rate (e.g. 1/16), since the threshold value will be used to test whether the trend in transmission rate is stable, and too small a threshold value might produce more false stability detections. The threshold to determine if there is a downward trend, gradientThreshDown, may advantageously be calculated as twice gradientThreshUp, but with negative sign. Twice, or some other factor greater than 1, in order to have a lower probability of erroneously detecting a downward trend. Summarizing, the gradientThreshUp and gradientThreshDown calculation can be performed as (the sign "·" meaning multiplication and "/" meaning division):

$$gradientThreshUp = ((flightSizeThresh/flightSizeRef)/2) \cdot rateRef$$

$$gradientThreshUp = min(gradientThreshUp, rateRef/16)$$

$$gradientThreshDown = -2 \cdot gradientThreshUp$$

Alternatively, the gradient thresholds can be linked to the variability in the measured transmission rate. In that case, an estimate of that variability is required, such as the mean absolute deviation. The mean deviation in transmission rate can be calculated in conjunction with the filtering in step 330, and stored in a variable rateMeanDev, using an exponentially weighted mean average (with a factor $a=1/16$, for example). A multiple (e.g. 2 for upward trend threshold and 4 for downward trend threshold) of this variable can then be used to calculate the transmission rate thresholds. Just as in the previous calculation, it may be also beneficial to force a maximum value in the threshold. Summarizing ("||" meaning absolute value):

$$rateMeanDev = rateMeanDev + a \cdot (|rateFiltered - rateMeasured| - rateMeanDev)$$

$$gradientThreshUp = (2 \cdot rateMeanDev, rateRef/16)$$

$$gradientThreshDown = -2 \cdot gradientThreshUp$$

Yet another alternative to calculate the gradient could be to determine the change in transmission rate associated with every change in flight size. Since there may be several contiguous new ACK's with the same measured flight size and different measured transmission rates (in congestion avoidance, for example, the actual congestion window is actually increased once every congestion window bytes, which should normally be reflected in the same way in the flight size), an initial filtering would include determining the mean transmission rate value for every flight size value (these mean values could be stored in a rateFiltered variable, for example). Then, a rate gradient value could be the division of the change in mean transmission rate by the change in flight size from the previous different flight size value, i.e.:

$$rateGradient = (rateFiltered - ratePrev)/(flightSizeMeasured - flightSizePrev)$$

Figure 6:
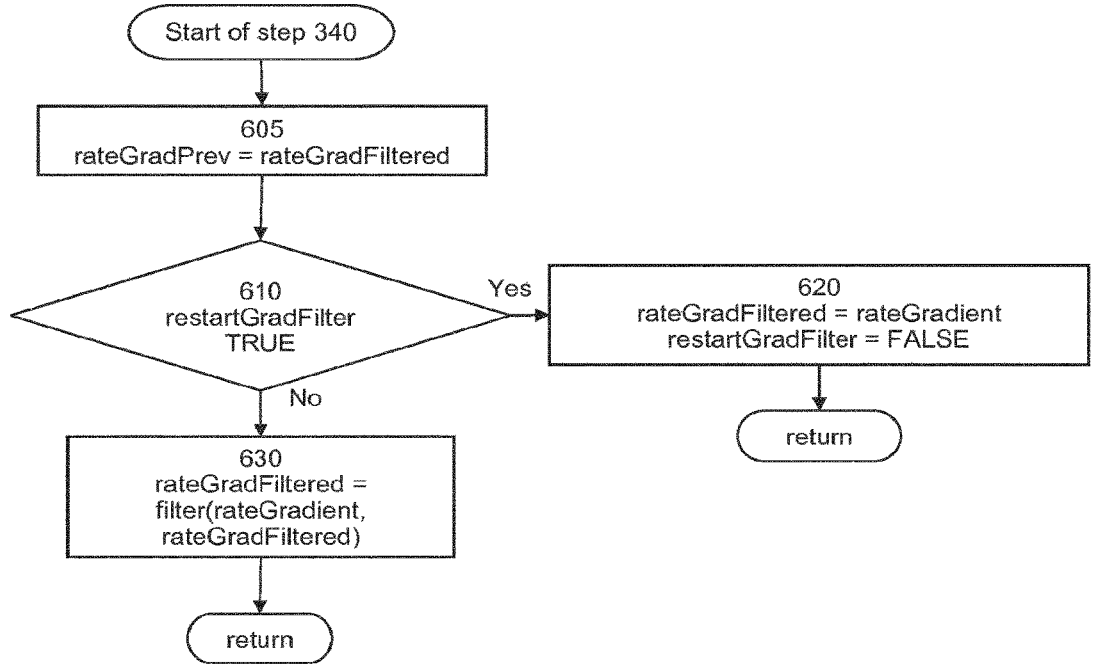
FIG. 6 is a flow diagram illustrating the main steps of an embodiment of the transmission rate gradient filtering step.

In this case, the ratePrev value would correspond to the mean transmission rate calculated when the flight size had the flightSizePrev value, while rateFiltered would correspond to the mean transmission rate calculated when the flight size is flightSizeMeasured. This value would be calculated once for every change in flight size. In fact, this gradient could be normalized by dividing it by (ratePrev/flightSizePrev). So normalized, a value of 1 would correspond to a situation in which the transmission rate increases, as a percent ratio, the same as the flight size, while a value of 0 would indicate a stable trend and a negative value a downward trend. However, a gradient calculated in this way will show a relatively large variability, so a Filter Rate Gradient step 340 would be very advantageous in reducing the observed variability. This step 340 could be implemented as shown in FIG. 6, which directly replicates the transmission rate filtering embodiment shown in FIG. 5. In this case, appropriate threshold values would be 0.5 for gradientThreshUp and −1 for gradientThreshDown.

Step 860 checks whether the current value of the (possibly filtered) gradient of the transmission rate is lower than its gradientThreshDown threshold calculated above, and if it is lower, in step 865, the variable rateTrend is set to "DOWN". If step 860 determines that the filtered transmission rate is not lower than its gradientThreshDown threshold calculated above, then step 870 checks whether the current value of the filtered transmission rate is higher than its gradientThreshUp threshold, and if it is, in step 875, the variable rateTrend is set to "UP". Finally, if step 870 determines that the current value of the filtered transmission rate is not higher than its gradientThreshUp threshold, then the variable rateTrend is set to "STABLE" in step 880. After any of steps 865, 875 and 880, the transmission rate trend estimation procedure is left (with rateTrend set to its determined value, UP, DOWN or STABLE).

The above described trend determination implementations (FIGS. 7 and 8) are only examples. It is noted that the present invention may adopt other implementations, too, among them those specified later on in this document for the determination of trends in transmission rate (using statistical non-parametric methods and model residuals). In general, the trend of flight size or transmission rate may be estimated by comparing gradient of the flight size or transmission rate with a threshold. The gradient may be calculated, for instance, as a difference between the current and the previous value of the flight size or the transmission rate, respectively. The difference may be calculated between the filtered previous value and the filtered current value, which results in variation-robust results. However, the differences may also be calculated between the previous filtered value and the measured current value, which may lead to faster reactions to temporal changes. The "previous value" is beneficially an immediately preceding value (filtered or measured). However, this is not meant to limit the present invention and the previous value may also be any preceding value. Moreover, the calculation of the trend may also be performed by taking into account more than one preceding measured or filtered values, which may provide the advantage of a more robust trend estimation.

Figure 9:
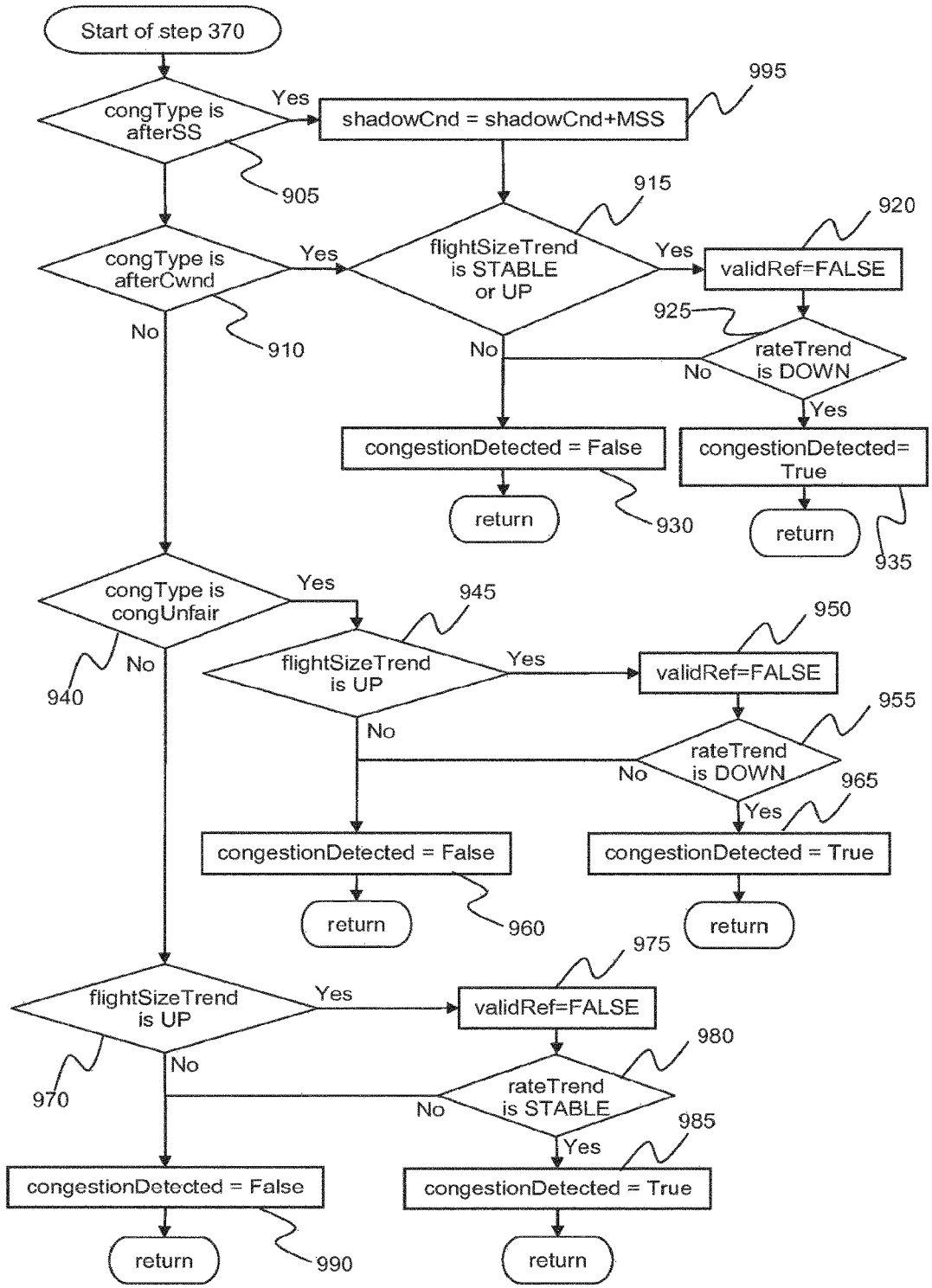
FIG. 9 is a flow diagram illustrating the main steps of an embodiment of the step for detecting congestion.

FIG. 9 illustrates a possible implementation of the congestion detection (corresponding to step 370). In step 995, if congType is "afterSS" (in step 905), it will add MSS bytes to the shadowCwnd variable. The shadowCwnd variable stores the value that the congestion window would have reached if it had remained in Slow Start (congType set to "afterSS" means it has recently left the Slow Start state), to be able to revert to it if necessary. If congType is set to "afterCwnd" in step 910 or if it is "afterSS" after step 995, (i.e. when trying to detect congestion with unfair competition after either a congestion window reduction or a switch from slow start to congestion avoidance), step 915 will check if the previously determined (in step 350) trend of flight size (flightSizeTrend) is "STABLE" or "UP", and if it is not (i.e. if it is "DOWN" or "UNDETERMINATE"), then step 930 will set the congestionDetected variable to False and end the congestion detection procedure with the result of negative congestion detection (no congestion detected). If flightSizeTrend is "STABLE" or "UP" in step 915, step 920 will then set the validRef variable to False, so that subsequent trend determination steps (steps 350 and 360) are forced to set new reference values. After step 920, if the previously determined (in step 360) trend of the transmission rate (rateTrend) is "DOWN" in step 925, then step 935 will set the congestionDetected variable to "True" and end the congestion detection procedure with the result of positive congestion detection (congestion in the network detected). Otherwise, if rateTrend is not "DOWN" in step 925 (i.e. if it is UP, STABLE or UNDETERMINATE), then step 930 will set the congestionDetected variable to False and end the congestion detection procedure (negative detection).

If in step 910 congType is not "afterCwnd" nor "afterSS", but in step 940 congType is "congUnfair" (i.e. when trying to detect congestion with unfair competition in congestion avoidance regime), step 945 will check if the previously determined (in step 350) trend of flight size (flightSizeTrend) is "UP", and if it is not (i.e. if it is "STABLE", "DOWN" or "UNDETERMINATE") then step 960 will set the congestionDetected variable to False and end the congestion detection procedure. If flightSizeTrend is "UP" in step 945, step 950 will then set the validRef variable to False, so that subsequent trend determination steps (steps 350 and 360) are forced to set new reference values. After step 950, if the previously determined (in step 360) trend of the transmission rate (rateTrend) is "DOWN" in step 955, then step 965 will set the congestionDetected variable to "True" and end the congestion detection procedure. Otherwise, if rateTrend is not "DOWN" in step 955 (i.e. if it is UP, STABLE or UNDETERMINATE), then step 960 will set the congestionDetected variable to False and end the congestion detection procedure (negative detection).

If in step 940 congType is not "congUnfair" (i.e. when trying to detect congestion without unfair competition in both slow start and congestion avoidance regimes) step 970 will check if the previously determined (in step 350) trend of flight size (flightSizeTrend) is "UP", and if it is not (i.e. if it is "STABLE", "DOWN" or "UNDETERMINATE") then step 990 will set the congestionDetected variable to False and end the congestion detection procedure. If flightSizeTrend is "UP" in step 970, step 975 will then set the validRef variable to False, so that subsequent trend determination steps (steps 350 and 360) are forced to set new reference values. After step 975, if the previously determined (in step 360) trend of the transmission rate (rateTrend) is "STABLE" in step 980, then step 985 will set the congestionDetected variable to "True" and end the congestion detection procedure. Otherwise, if rateTrend is not "STABLE" in step 980 (i.e. if it is UP, DOWN or UNDETERMINATE), then step 990 will set the congestionDetected variable to False and end the congestion detection procedure.

FIG. 9 illustrates the detection of a congestion situation and takes into account all above mentioned kinds of congestion (congestions in the respective Slow Start or Congestion Avoidance, congestion with or without competition). However, the present invention may also implement only detection and handling of one or a subset of these congestion types. Accordingly, only subsets of steps shown in FIG. 9 may be implemented. For instance, for detecting congestion without unfair competition, only steps 970-990 may be implemented. For instance, for detecting congestion with unfair competition, only steps 945-965 may be implemented. In particular, in the method according to an embodiment of the invention the step 370 of detecting whether or not there is congestion includes detecting whether or not there is a congestion with unfair competition. The congestion with unfair competition is then positively detected (step 965) when the trend of the flight size is increasing (step 945) and the trend of the transmission rate is decreasing (step 955), and negatively detected otherwise. Alternatively, or in addition thereto, in the method 250, the step of detecting whether or not there is a congestion 370 may include detecting whether or not there is a congestion without unfair competition; and the congestion without unfair competition may be positively detected when the trend of the flight size is increasing (step 970) and the trend of the transmission rate is substantially equal (step 980), and negatively detected otherwise.

Figure 10:
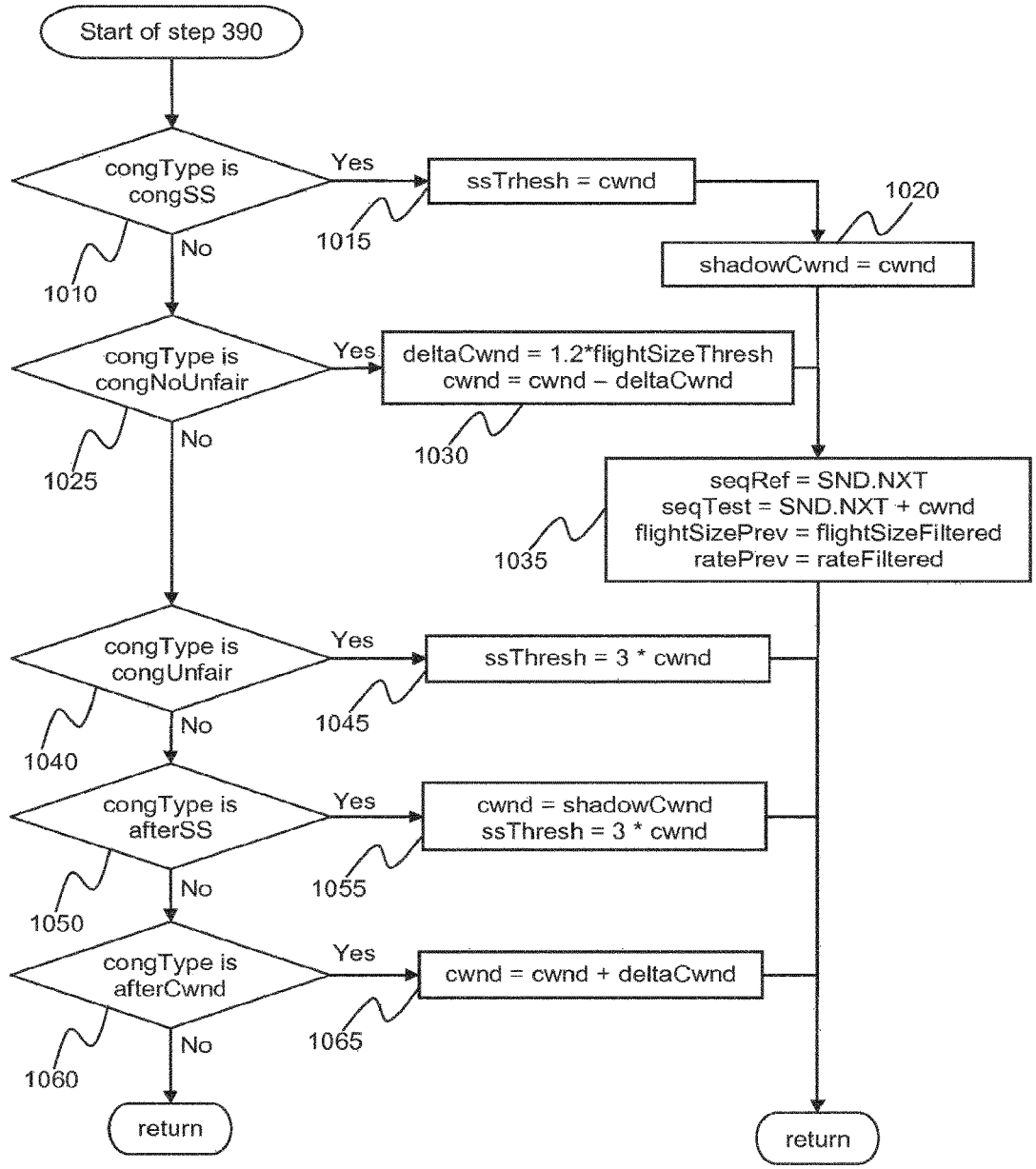
FIG. 10 is a flow diagram illustrating the main steps of an embodiment of the step for modifying the congestion window.

FIG. 10 illustrates a possible implementation of the congestion window modification (corresponding to step 390). In both the embodiments described in FIG. 3 and FIG. 4 this step is executed only if some kind of congestion has been previously detected in the congestion detection step 370. Step 390 then contains the actions to be performed in each of the five possible congestion types detected by step 370 and specified in the congType variable. If congType is "congSS" in step 1010 (i.e. if a congestion without unfair competition has been detected in slow start, for instance in step 935), then step 1015 will set the slow start threshold variable (ssthresh) to the current value of the congestion window (cwnd) thereby switching the congestion control state to Congestion Avoidance. After step 1015, step 1020 will set the shadowCnd variable to cwnd, too, so that this variable can be used to track what the congestion window could have been if the congestion had stayed in slow start (in the described embodiments, the shadowCwnd is subsequently updated in step 370). However, step 1015 is only necessary if after the detection of congestion without unfair competition in slow start, congType is set to "afterSS" to detect if there is congestion with unfair competition right after the switch from Slow Start to Congestion Avoidance. Thus, step 1015 would not be required in the general case of embodiment illustrated in FIG. 3 but would be required for the more particular embodiment of FIG. 4 (described below in detail).

If congType is "congNoUnfair" in step 1025 (i.e. if a congestion without unfair competition has been detected in congestion avoidance), then step 1030 will reduce the congestion window by an amount of deltaCwnd. That amount in bytes (deltaCwnd) may be a fixed proportion of the congestion window (for example, 20%) or may be a proportion of the flight size threshold used in determining the trend of the flight size (flightSizeThresh). In the latter case, it is advisable for it to be somewhat larger (e.g. 1.2×flightSizeThresh), so if a congestion has been detected, the congestion window will be reduced beyond the real congestion trigger, thus allowing it to oscillate around that congestion trigger point in successive rounds of congestion window growth and reductions due to congestion detection.

Step 1035 follows either step 1020 or step 1030, but it is only necessary if after the detection of congestion without unfair competition, congType is set to either "afterSS" or "afterCwnd", to detect if there is congestion with unfair competition right after the switch from slow start to congestion avoidance or after the congestion window reduction, respectively. Thus, step 1035 would not be required in the embodiment illustrated in FIG. 3 but would be implemented for that of FIG. 4. Step 1035 includes setting the variable seqRef to SND.NXT, which is the sequence number at which the reference values for flight size and transmission rate will be chosen in determining their trends (actually, the values just prior to seqRef are taken, except in the case of the flight size when congType is afterCwnd, when the value right after seqRef is taken, as can be seen in FIG. 7 and in FIG. 8).

If congType is "congUnfair" in step 1040 (i.e. if a congestion with unfair competition has been detected in congestion avoidance), then step 1045 will set the slow start threshold variable (ssthresh) to a larger value, for example 3 times the current value of the congestion window (cwnd), thereby switching the congestion control state to slow start.

If congType is "afterSS" in step 1050 (i.e. if a congestion with unfair competition has been detected after a transition from slow start to congestion avoidance), then step 1055 will set the congestion window to the value of the shadowCwnd variable (which reflects the value that would have been attained by cwnd if the connection had stayed in slow start). Step 1055 will also set the slow start threshold variable (ssthresh) to a larger value, for example 3 times the value of the congestion window (cwnd), thereby switching the congestion control state to slow start.

If congType is "afterCwnd" in step 1060 (i.e. if a congestion with unfair competition has been detected after a reduction in congestion window due to a congestion detection), then step 1065 will add to the congestion window the value previously stored in the deltaCwnd variable reflecting the reduction in cwnd when congestion was detected at a prior time. In this way, the reduction in cwnd is "undone".

For the embodiment illustrated in FIG. 3, using the embodiments of steps 330, 340, 350, 360, 370 and 390, as illustrated in FIGS. 5-10, it is beneficial to initialize some of the variables used, namely, the restartGradFilter, restartRateFilter and validRef variables should be initialized to "FALSE" whenever the connection starts or there is an RTO time-out or an inactivity time-out. Additionally, congType should be set at the start of the connection to whatever congestion detection type is required.

FIG. 10 shows handling of all above described congestion conditions, and in particular, to modification 390 of the congestion window. However, the present invention may also be implemented only for individual conditions or their subsets. In general, the step of modifying the congestion window 390 includes increasing (step 1045) the slow start threshold upon positively detecting the congestion with unfair competition (step 1040), which will switch the connection to Slow Start. FIG. 10 exemplified the slow start threshold increase as multiplying the current congestion window by three. However, this is only an example and the increase may be performed by a different multiplier or in another way. In case of the TCP, the increase of the congestion window size upon positively detecting the congestion with unfair competition is beneficially performed if the transmitting node is in TCP congestion avoidance congestion control state and not performed otherwise.

Alternatively, or in addition, the step 390 of modifying the congestion window may include reducing (step 1030) the congestion window size upon positively detecting (step 1025) the congestion without unfair competition. The reduction of the congestion window size upon positively detecting the congestion without unfair competition, when using the TCP, is performed if the transmitting node is in TCP congestion avoidance congestion control state ("No" in step 1010 for not being in Slow Start) and not performed otherwise.

Still alternatively or in addition to the previously described congestion window handling approaches, the step 390 of modifying the congestion window may include changing from a current congestion control state to a new congestion control state upon positively detecting the congestion with unfair competition, wherein the current and the new congestion control states specify respectively a current and a new rule for increasing the congestion window size upon receipt of data acknowledgements when neither congestion nor data losses have been detected, and the new rule specifies a faster rate of increasing the congestion window size than the current rule. In case of the TCP, the change from a current congestion control state to a new congestion control state upon positively detecting the congestion with unfair competition may be performed if the current congestion control state is TCP congestion avoidance and not performed otherwise, and the new congestion control state may correspond to the TCP slow start. In case of TCP, the change from a current congestion control state to a new congestion control state upon positively detecting the congestion with unfair competition is beneficially performed if the current congestion control state is TCP congestion avoidance and not performed otherwise, and the new congestion control state is TCP slow start.

Yet alternatively or in addition to the previously described implementations, the step 390 of modifying the congestion window may include changing from a current congestion control state to a new congestion control state upon positively detecting the congestion without unfair competition, wherein the current and the new congestion control states specify respectively a current and a new rule for increasing the congestion window size upon receipt of data acknowledgements when neither congestion nor data losses have been detected, and the new rule specifies a slower rate of increasing the congestion window size than the current rule. In case of TCP, it is advantageous when the change from a current congestion control state to a new congestion control state upon positively detecting the congestion without unfair competition is performed if the current congestion control state is TCP slow start and not performed otherwise, and the new congestion control state is TCP congestion avoidance state.

Figure 4:
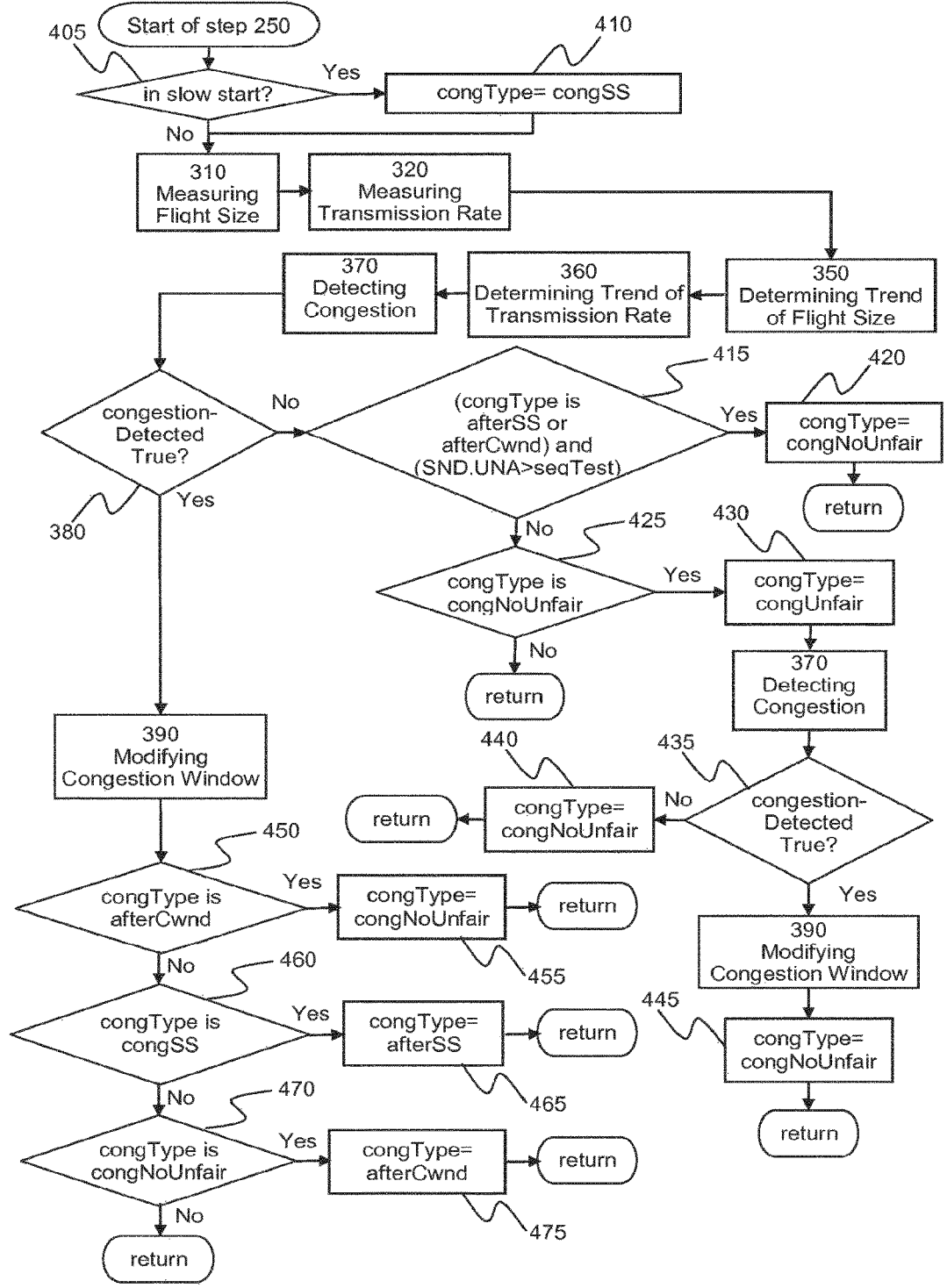
FIG. 4 is a flow diagram illustrating the main steps of another embodiment of the methods of this invention that includes the five congestion detection types of the invention in a coordinated fashion.

FIG. 4 shows one possible embodiment of the methods of the invention, including all five types of congestion detection steps (with their respective associated actions) in a coordinated way. FIG. 4 shows a possible implementation of the congestion and competition detection steps 250 which are assumed to be executed as part of the processing of a new ACK, after the calculation (230) of RTT. In addition to the steps included in FIG. 4, there is one more step that is part of the invention that is executed after the steps described in FIG. 4 (see FIG. 2): Transmitting Data while Respecting Congestion Window Size (270), already described above.

The embodiment of the invention described in FIG. 4 uses all the steps used in the embodiment described in FIGS. 3 (310, 320, 350, 360, 370, 380 and 390) and adds more steps to manage the congType variable, which specifies the kind of congestion detection to use. In this way, this embodiment will detect congestion without unfair competition when in Slow Start, and when such congestion is detected, the connection will be switched to congestion avoidance. Right upon switching to Congestion Avoidance, it will determine if there is then congestion with unfair competition with reference to the time when the switching occurred and if so, switch back to connection to Slow Start. Once in Congestion Avoidance, it will check for congestion without unfair competition, which will be treated by reducing the congestion window. This reduction of congestion window due to congestion will trigger a special check to verify there is not congestion with unfair competition with reference to the time when the congestion window was reduced, which, if found, will force undoing the reduction in congestion window. If congestion without unfair competition is not detected in Congestion avoidance, it will also check for congestion with unfair competition, upon which it will switch the connection to Slow Start There follows a more detailed description of the steps in the embodiment illustrated in FIG. 4. If part of an embodiment as described in FIG. 2, the steps in FIG. 4 would be invoked for every New ACK message, when in Slow Start or Congestion Avoidance. In step 405, if the connection is in Slow Start, the congType variable is set to "congSS" in Step 410 to determine the detection of congestion without unfair competition in Slow Start. If not, the previous value of congType will remain. In both cases, the following two steps will be performed to measure the flight size, 310 and to measure the transmission rate, both of which can be implemented as described above (when describing those same steps for the embodiment illustrated by FIG. 3). The next steps will be those of determining the trend of flight size 350 (with one possible embodiment illustrated in FIG. 7), determining the trend of transmission rate 360 (with one possible embodiment illustrated in FIG. 8) and detecting congestion 370 (with one possible embodiment illustrated in FIG. 9), all of them already described in detail as part of the description of the embodiment in FIG. 3.

Then, if in step 380 the congestionDetected variable is True (i.e., that some kind of congestion was detected in step 370), step 390 (with one possible embodiment illustrated in FIG. 10) will be performed to modify the congestion window appropriately. Then, if in step 450 congType is "afterCwnd" (congestion with unfair competition after a congestion window reduction), step 455 will set congType to "congNoUnfair" (congestion detection without unfair competition in congestion avoidance). If, however, congType was "congSS" (congestion detection without unfair competition in slow start), step 460 will lead to step 465, in which congType will be set to "afterSS" (congestion detection with unfair competition after a transition to slow start). Finally, if congType was "congNoUnfair" (congestion detection without unfair competition in congestion avoidance), step 470 will lead to step 475, in which congType will be set to "afterCwnd" (congestion detection with unfair competition after a reduction in congestion window).

On the other hand, in FIG. 4, if in step 380 congestionDetected is False, i.e. no congestion was detected, step 415 will verify if SND.UNA is larger than seqTest in cases where congType is either "afterSS" or "afterCwnd", and if so set congType to "congNoUnfair" in step 420. This ensures that the detection of congestion with unfair competition with respect to specific events (the transition to Congestion avoidance and the reduction of congestion window due to congestion) is only performed up to the sequence number specified by seqTest, and after that the congestion detection mode will be switched to congestion detection without unfair competition in congestion avoidance. In fact, if the verification in step 415 is not positive and if step 425 determines that congType is "congNoUnfair" (i.e. congestion without unfair competition in congestion avoidance has been tested but not found), then step 430 will set the congType to "congUnfair" (congestion with unfair competition in congestion avoidance) and then run another congestion detection step 370 (with one possible embodiment illustrated in FIG. 9), with the same trend information but in this case checking for a different type of congestion. If step 435 verifies that this new congestion detection has been negative, then step 440 sets the congType back to "congNoUnfair", so that for the next new ACK congestion without unfair competitions will again be tested and if not found, congestion with unfair competition is tested. If step 435 finds that congestion with unfair competition was detected, then step 390 (with one possible embodiment illustrated in FIG. 10) will modify the congestion window appropriately an finally step 445 will set the congType back to "cong-NoUnfair". If, as in the embodiment of step 390 illustrated in FIG. 10, the connection is switched to Slow Start in some cases, congType will not be changed to "congSS" until the next New ACK, when the step 405 detects the congestion is in Slow Start.

For the embodiment illustrated in FIG. 4, using the embodiments of steps 350, 360, 370 and 390, as illustrated in FIGS. 7-10, it is beneficial to initialize some of the variables used, namely: congType should be initialized to "congSS", while the restartGradFilter, restartRateFilter and validRef variables should be initialized to "FALSE", whenever the connection starts or there is an RTO time-out or an inactivity time-out.

Determination of Transmission Rate Trend Using Statistical Non Parametric Methods Since the filtered transmission rate can exhibit large variability and this variability may not follow a well-defined statistical distribution, it may be beneficial to use a statistical non-parametric method to determine the trend in the transmission rate. In this case, a possible implementation of step 360 could still be based on FIG. 8, with a number of differences with respect to the implementation described above. The main difference would be that instead of the rateFiltered variable, a new variable called rateSample would have to be used, with rateSample being a vector or array of N (e.g. 5) samples of rateFiltered. A possible initial step, after step 330 and before step 810, for example, would assign values to the N components rateS ample. In this way, rateS ample would have the last N values of rateFiltered, or a subset of the last values. In any case, assuming that every instance of rateFiltered in FIG. 8 was now an instance of rateS ample, another required change would be that the ratePrev and the rateRef variables would also have to become N-component vectors or array variables. When in step 830 rateRef is assigned the value of rateFiltered, and when in step 845 rateRef is assigned the value of ratePrev, these assignments would be vector/array assignments, i.e. they would assign all the components of the vector or array. Another change required would be not to use steps 850 (Calculate Rate Gradient) and step 340 (Filter Rate Gradient), and go directly to the calculation of gradientThreshUp and GradientThreshDown, which would still be a scalar variable (i.e. it would not become a vector/array), and which could be calculated as a fraction of the ratio of the threshold flight size to the reference flight size (i.e. flightSizeThresh/flightSizeRef), applied to the mean reference transmission rate (derived from the samples stored in rateRef). This is similar as described above in one of the possible implementations of step 855, but using the mean of the samples of rateRef i.e.:

gradientThreshUp=((flightSizeThresh/flightSizeRef)/2)·mean(rateRef)

gradientThreshUp=min(gradientThreshUp,mean(rateRef)/16)

gradientThreshDown=−2·gradientThreshUp

The most important changes would be in steps 860 and 870. Step 860 would check if the gradient in transmission rate is positive by checking if rateSample vector is greater than the vector resulting from the sum of gradientThreshUp to each of the N components of rateRef. Step 870 would check if the gradient in transmission rate is negative by checking if rateS ample vector is smaller than the vector resulting from subtracting gradientThreshUp from each of the N componenents of rateRef. This leaves two vector inequalities (">" and "<") tests which is where the non-parametric statistical methods could be used, in particular, the well-known Mann-Whitney U test (also called the Mann-Whitney-Wilcoxon, Wilcoxon rank-sum test, or Wilcoxon-Mann-Whitney test) could be used to determine if the two samples of N values (each represented by an N-component vector/array) are larger (come from a population with a larger median), smaller (come from a population with a smaller median) or equal (come from the same population).

The test is easily performed by assigning a rank to each of the N values of the two vectors being compared, that is, ordering the 2*N values in sequence and assigning them their order number (with ties assigned the same number). Then, taking the vector/array with the lower median value, for each of its N components, count the number of observations in the other vector/array that have a smaller rank (count a half for any that are equal to it). The sum of these counts is the U statistic. For N=5, which is an appropriate sample count value, according to standard tables for a one-sided test with a 90% confidence interval, a U value of 5 or less means that the sample (vector/array) in this case is lower than the other, while a value of 20 or more means that the sample (vector/array) in this case is higher than the other.

Determination of Transmission Rate Trend Using Model Residuals

An alternative way to determine the trend of the transmission rate is to use a statistical test to detect a trend in the transmission rate measurements and then use a metric produced by the test as the gradient, with the metric being then filtered (by accumulating or averaging it over time, for example). One possible such test, to detect an upward trend would be to fit two models to the measured data, one with the expected behaviour without congestion and the other with the expected behaviour without congestion. Then, a metric that compares how well the two models fit the measured data can be used as a kind of gradient from which the trend in transmission rate is derived. For example, every transmission rate measurement may be compared against a model that predicts it to be the same as the previous value (that is, a random walk model, which could be expected from a congestion situation), and then compared against a model that predicts an increment in transmission rate from the last value in the same proportion as the measured flight size increment (which could be expected in a non-congestion situation). This would produce a residual error in each case, which is squared and then one is divided by the other, producing a metric indicating which model fits the measured data better.

Figure 11:
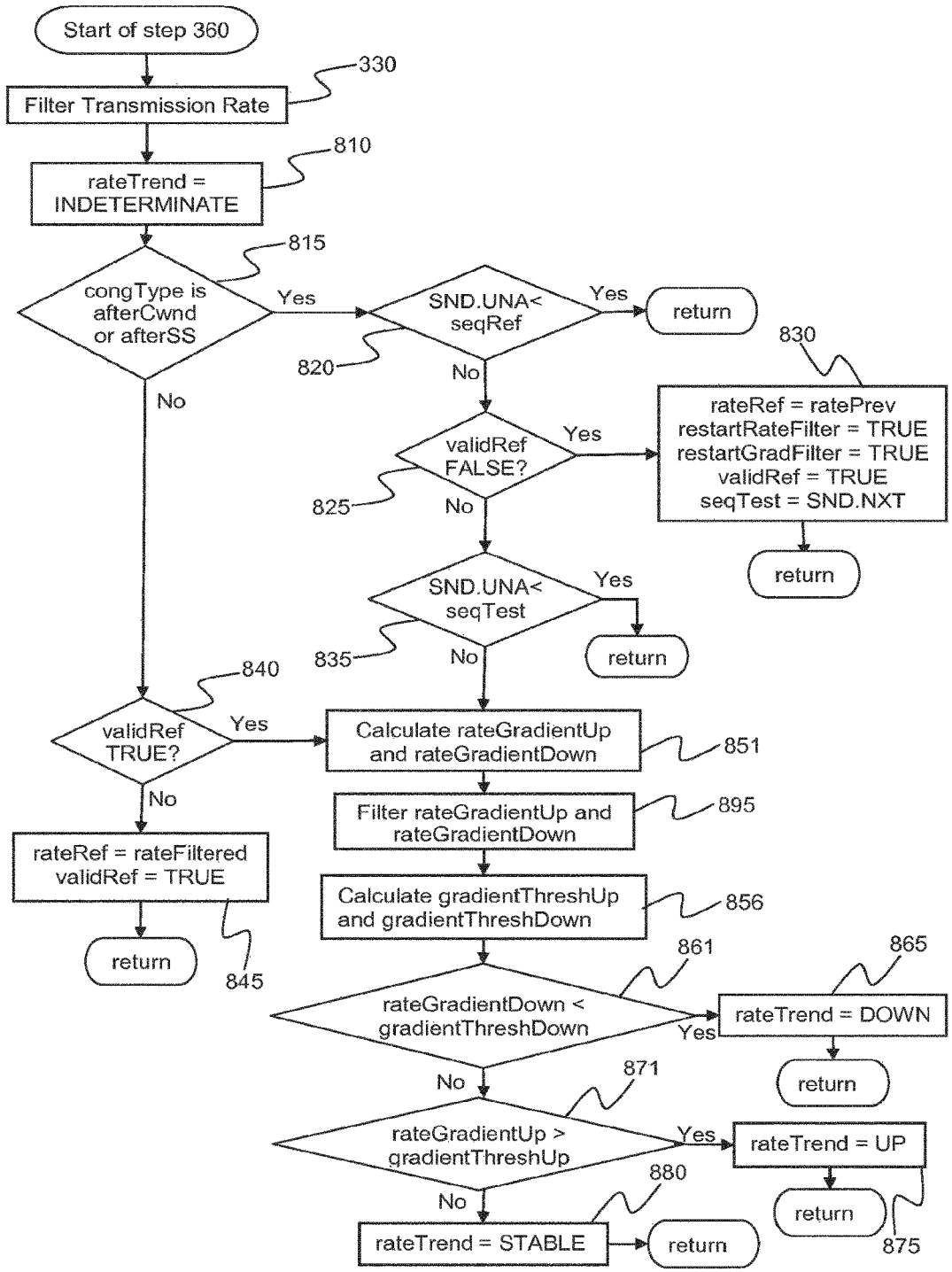
FIG. 11 is a flow diagram illustrating the main steps of an alternative embodiment of the step for determining the trend of the transmission rate.

A possible implementation of this method is illustrated in FIG. 11, which is identical to FIG. 8 except in a few aspects that will now be described. The gradient described in the previous paragraph can only be used to detect an upward trend in transmission rate, so another gradient will be required for testing if the trend is downward. Thus, in the exemplary embodiment of step 360 shown in FIG. 11, the gradient produced by step 851 will be a two-valued variable: it will produce a gradient for the downward trend test (to be stored in a variable called rateGradientDown) and a gradient for the upward trend test (to be stored in a variable called rateGradientDown). Each of those gradients will be filtered independently in step 895 and then step 856 will produce one threshold value for the upward trend test (to be stored in the gradientThreshUp variable) and another for the downward trend test (to be stored in the gradientThreshDown variable).

For the upward trend test, a metric that compares the fit of the two models described could be used, for example, the quotient of the squared error residuals:

rateGradientUp=(rateMeasured−ratePrev)^2/[rateMeasured−ratePrev·(1+(flightSizemeasured−flightSizePrev)/flightSizePrev)]^2

For the downward trend tests, it would be possible to use a gradient as already used in previously described exemplary embodiments of step 360:

rateGradientDown=rateFiltered−rate Ref

Then, step 895, Filter rateGradienUp and rateGradienDown, could use an exponentially weighted moving average of both gradients (as described above). Other filtering methods would be possible for rateGradienUp, like accumulating independently the sum of squared residuals for each of the two models, and then producing an updated filtered gradient by dividing the accumulated sums of squared residuals.

After step 895, step 856 could calculate the two thresholds:

gradientThreshDown=((flightSizeThresh/flightSizeRef)/2)·rateRef gradientThreshDown=−2·min(gradientThreshDown, rateRef/16)

gradientThreshUp=2

The threshold used for the downward trend calculation is as already used in previously described exemplary embodiments of step 360, while the threshold of 2 used for gradientThreshUp would be reached when the squared residuals (the errors) in the model predicting congestion are larger (twice as large) than the squared residuals (errors) in the model without congestion.

After step 856, steps 861 and 871 will compare the threshold and make the trend determination in almost the same way as previously described for other embodiments of step 360, except that there would be a specific gradient used for the upward trend determination and another for the downward trend determination.

Figure 12:
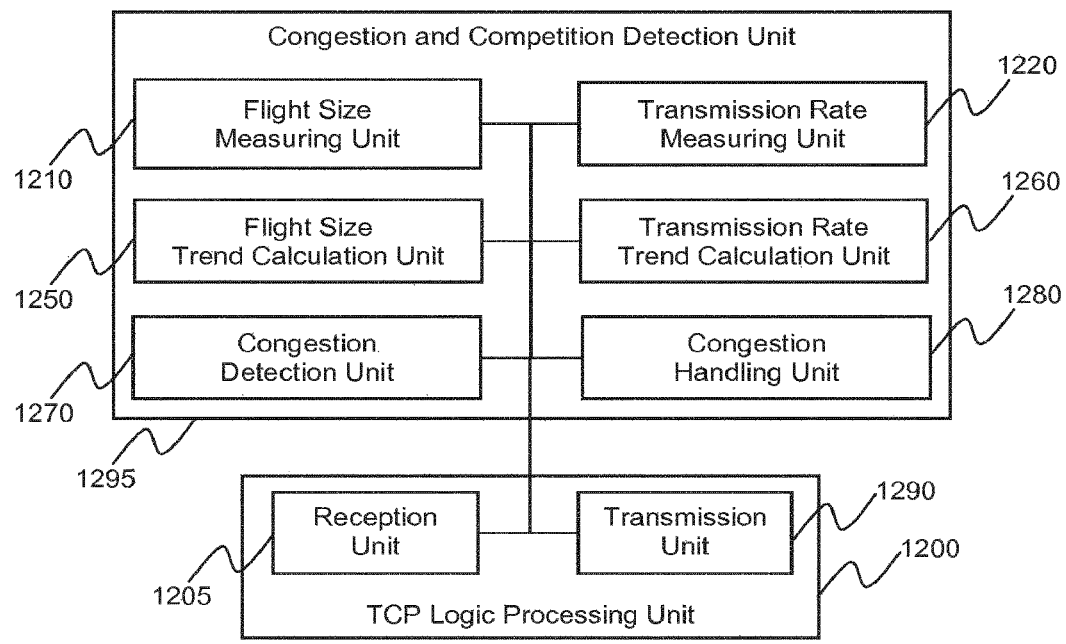
FIG. 12 is a block diagram illustrating an apparatus for embodying the present invention.

An embodiment of the present invention includes an apparatus which is configured to execute any of the above described methods. An example of such apparatus is illustrated in FIG. 12. For instance, an apparatus is provided for controlling, in a transmitting node (such as sending host 110, 111 or proxy 130), congestion in a data communication protocol employing acknowledged communication in which the transmitting node transmits data to a receiving node and the receiving node acknowledges receipt of the data, wherein a congestion window specifies a maximum amount of unacknowledged data which the transmitting node may transmit before reception of a positive acknowledgement for all or part of that data. The apparatus comprises a flight size measuring unit 1210 for measuring a flight size indicating an amount of data sent by the transmitting node and not yet acknowledged by the receiving node; a transmission rate measuring unit 1220 for measuring a transmission rate, the transmission rate corresponding to a same time instant as the flight size; a flight size trend calculation unit 1250 for determining a trend of the flight size; a transmission rate trend calculation unit 1260 for determining a trend of the transmission rate; a congestion detection unit 1270 for detecting whether or not there is a congestion according to the determined trend of the transmission rate and the trend of the flight size; a congestion handling unit 1280 for, upon positive detection of the congestion by the congestion detection unit, modifying the congestion window; and a transmission unit 1290 for transmitting data while respecting the congestion window size.

In particular when the apparatus is implementing the TCP, such apparatus advantageously includes a TCP Logic Processing Unit 1200 and a Congestion and Competition Detection Unit 1295 which at least logically (and possibly also physically, i.e. by implementing them by a single processing device) encompasses the above mentioned units.

The TCP Logic Processing Unit 1200 includes the logic required to send and receive data using the TCP protocol. The Reception Unit 1205 in the TCP Logic Processing Unit comprises the TCP functionality for receiving TCP segments while the Transmission Unit 1290 comprises the TCP functionality for sending TCP segments, in both cases according to the TCP standards, like the IETF RFC 793 and others cited above. The Transmission Unit, in particular, also includes the enforcement of the TCP Congestion Window and the TCP Send Window, so that packets are transmitted only when those parameters permit.

The Congestion and Competition Detection Unit 1295 comprises the other elements in the invention, apart from the above mentioned Transmission Unit: a Flight Size Measuring Unit 1210, a Transmission Rate Measuring Unit 1220, a Flight Size Trend Calculating Unit 1250, a Transmission Rate Trend Calculating Unit 1260, a Congestion Detection Unit 1270 and a Congestion Handling Unit 1280. The TCP Logic Processing Unit 1200 invokes the functionality of the Congestion and Congestion and Competition Detection Unit for every New ACK (as previously defined) received by the Reception Unit for connections in the Slow Start or Congestion Avoidance states, possibly including the value of the SND.UNA variable at the time the data segment being acknowledged by the New ACK. The Congestion and Congestion and Competition Detection Unit has access (via memory, for example) to the current values of the SND.NXT, SND.UNA, last measured RTT, cwnd and ssTrhesh variables of the TCP connections in the TCP Logic Processing Unit, including the possibility of changing the stored values of the cwnd and ssThresh. Additionally, the internal units of the Congestion and Competition Detection Unit may communicate among themselves through variables stored in memory.

Figure 13:
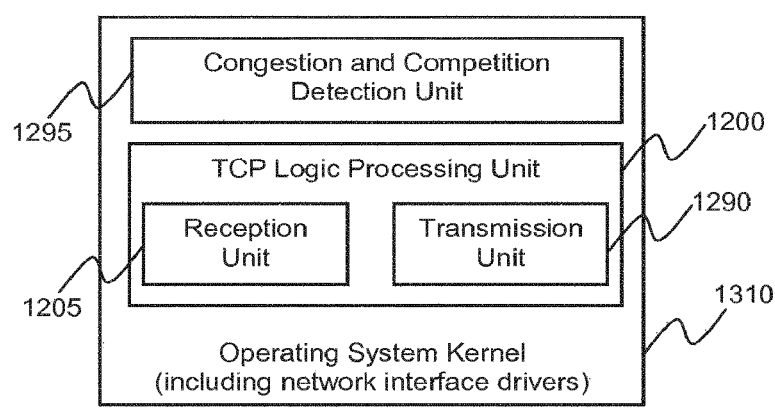
FIG. 13 is a block diagram illustrating an implementation in the kernel of an operating system of an apparatus embodying the present invention.

The TCP Logic Processing Unit 1200 and the Congestion and Congestion and Competition Detection Unit 1295 may be implemented as part of the kernel of an operating system 1310, as illustrated in FIG. 13. The operating system kernel includes the network interface drivers and software libraries that enable sending and receiving data packets to and from other systems via data networks. In such an implementation, the TCP Processing Logic Unit 1200 could be the TCP functionality in the kernel of most operating systems (e.g. Linux, Windows, BSD, OSX, Android, IOS), adapted to invoke the Congestion and Competition Detection Unit 1295 for New ACKs as described above, allowing access to the SND.UNA, SND.NXT, last measured RTT, cwnd and ssThresh also as described above. The Transmission Unit 1290 in the Processing Logic Unit 1200 would require no adaptations in that case, except for storing the value of the SND.UNA variable when segments are sent out.

Figure 14:
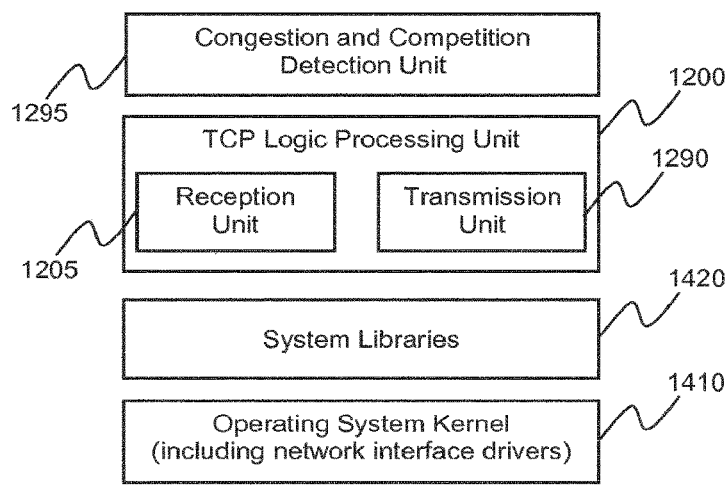
FIG. 14 is a block diagram illustrating an implementation outside the kernel of an operating system of an apparatus embodying the present invention.

Alternatively, the TCP Logic Processing Unit 1200 and the Congestion and Congestion and Competition Detection Unit 1295 may be implemented not being part of the kernel of an operating system 1410, as illustrated in FIG. 14, in "user-space". In such an implementation, the apparatus would have an operating system kernel, including the network interface drivers and software libraries that enable sending and receiving data packets to and from other systems via data networks. The TCP Processing Logic Unit 1200 in this case implements the TCP protocol in "userspace" (outside the kernel), including a Transmission Unit 1290 to send out data segments according to the TCP protocol, i.e. respecting a Congestion Window and a Send Window for the connection, as previously described, via System Libraries 1420 that interface the communication with the operating system kernel. The TCP Processing Logic Unit 1200 in this case stores the value of the SND.UNA variable when segments are sent out.

The implementation of the units comprised in the Congestion and Congestion and Competition Detection Unit 1295 may be realized by configuring the execution of the steps described above, as part of the exemplary embodiments of the methods of this invention. In particular, the Flight Size Measuring Unit 1210 is configured to execute step 310, Measuring the Flight Size; the Transmission Rate Measuring Unit 1220 is configured to execute step 320, Measuring the Transmission Rate; the Flight Size Trend Calculation Unit 1250 is configured to execute step 350, Determining the Trend of Flight Size; the Transmission Rate Trend Calculation Unit 1260 is configured to execute step 360, Determining the Trend of Transmission Rate; the Congestion Detection Unit 1270 is configured to execute step 370, Detecting Congestion, and the Congestion Handling Unit 1280 is configured to execute step 390, Modifying Congestion Window, but only in cases where the Congestion Detection Unit has detected congestion.

Figure 15:
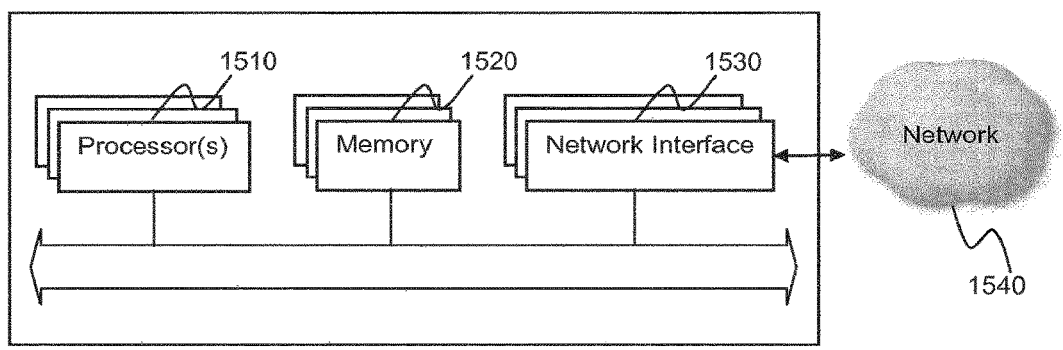
FIG. 15 is a block diagram illustrating an apparatus for embodying the present invention.

Moreover, the present invention may be embodied in an apparatus as shown in FIG. 15 corresponding to a processing device comprising one or more processors 1510, a memory 1520 or a set of memories and one or more network interfaces 1530, all interconnected, with the memory storing instructions which, when executed by the processor, cause the processor to perform operations comprising the steps of any of the methods described above. In particular, the processor(s) may be configured for receiving New ACK messages (step 220, described as part of an embodiment of the methods of the invention and illustrated in FIG. 2); processing of New ACK message, possibly including SND.UNA parameter updating (step 220, described as part of an embodiment of the methods of the invention and illustrated in FIG. 2); measuring the RTT updating (step 230, described as part of an embodiment of the methods of the invention and illustrated in FIG. 2); if the connection of the received New ACK is in Slow Start or Congestion Avoidance, then performing Congestion and Competition Detection updating (step 250, described as part of an embodiment of the methods of the invention and illustrated in FIG. 2); additional processing of New ACK message, as required by TCP updating (step 260, described as part of an embodiment of the methods of the invention and illustrated in FIG. 2); and transmitting data while respecting Congestion Window size updating (step 270, described as part of an embodiment of the methods of the invention and illustrated in FIG. 2). The apparatus of FIG. 15 may store the instructions for performing any of the method described above in the memory 1520 or a plurality of such memories. The instructions may then be executed by the processor 1510 or a plurality of such processors and the congestion control may be then performed on the basis of the communication such as acknowledgement and data transmitted or received via the network interface 1530 and evaluated (measured, filtered, processed to gain trends, test conditions) as described above.

The Congestion and Competition Detection may, for example, be implemented as previously specified in the detailed description of the embodiment described in FIG. 3. It may also, for example, be implemented as previously specified in the detailed description of the embodiment described in FIG. 4.

The processors used for the apparatus implementation may be, for example, general-purpose processors, microcontrollers, processors optimized for mobile phones or tablet devices, customized ASIC's, FPGA's or other similar devices. The memory may be RAM, ROM, EPROM, EEPROM, hard disk, solid-state disk, or similar storage devices, or any combinations thereof. The network interfaces may allow sending and receiving data to networks via wire-based ports (e.g. Ethernet, cable, fiber, ISDN, ADSL) or wireless ports (e.g. Wifi, WiMax, GPRS, UMTS, HSPA, LTE, microwave links). The networks for through which the apparatus embodying the present invention may communicate are, for example, LAN, WAN, satellite, 3G wireless, 4G wireless, cable, backhaul, etc.

The apparatuses exemplified above implement TCP communications. However, but the present invention is not limited thereto and may also be used with any other communication protocols using acknowledged communication.

Moreover, the apparatuses as described above may be applied to endpoints such as hosts (illustrated in FIG. 1A) and also to proxy nodes (illustrated in FIG. 1B). In the latter case, for example, in a TCP proxy, an apparatus embodying the invention would apply the congestion and completion detection and control to the sending functionality.

Moreover, the present invention may be embodied as a data carrier storing a program including instructions capable of causing, when run on a computer, the computer to execute the steps of any of the above described methods. The data carrier may be a portable data carrier such as flash memory connectable to a computer via USB interface, an optical medium such as a CD, DVD, BlueRay or other. The data carrier may also be a hard drive or any other storage medium.

Summarizing, the present invention relates to congestion control for acknowledged communication over networks. The congestion is detected on the basis of the trends of both the flight size and the transmission rate in order to adapt the congestion window in accordance with the detection result. Such congestion detection enables, for instance, distinguishing between the congestion with or without unfair competition. Moreover, the measured transmission rate may be filtered to compensate for time variations. The invention may be embodied within an end node or within a proxy.

What is claimed:

1. A method for congestion control in a data communication protocol employing acknowledged communication in which a transmitting node transmits data to a receiving node and the receiving node acknowledges receipt of the data, the method to be performed by the transmitting node and comprising:
    measuring a flight size indicating an amount of data sent by the transmitting node and not yet acknowledged by the receiving node;
    measuring a transmission rate;
    determining a trend of the flight size;
    determining a trend of the transmission rate, wherein the trend is derived from a transmission rate gradient calculation, in which either the transmission rate measurements or the transmission rate gradient calculations or both, are filtered to reduce their temporal variability;
    detecting whether there is a congestion according to the determined trend of the transmission rate and the trend of the flight size;

upon detection of the congestion, changing from a current congestion control state to a new congestion control state; and transmitting data while respecting a maximum amount of unacknowledged data which the transmitting node may transmit.

2. The method of claim 1, wherein the current and the new congestion control states specify respectively a current and a new rule for increasing the flight size upon receipt of data acknowledgements, and the new rule produces a slower rate of increasing the flight size than the current rule.

3. The method of claim 1, wherein
the congestion is detected when the trend of the flight size is increasing and the trend of the transmission rate is substantially stable.

4. The method of claim 3, wherein the current and the new congestion control states specify respectively a current and a new rule for increasing the flight size upon receipt of data acknowledgements, and the new rule produces a slower rate of increasing the flight size than the current rule.

5. The method of claim 3, wherein the current and the new congestion control states specify respectively a current and a new rule for modifying the flight size upon receipt of data acknowledgements, and the new rule produces lower flight size values than the current rule.

6. The method of claim 5, wherein the trend of the flight size is calculated as a comparison of the current flight size and an estimate of a previous flight size.

7. The method of claim 1, wherein the trend of the flight size is calculated as a comparison of the current flight size and an estimate of a previous flight size.

8. The method of claim 1, wherein the congestion is detected when the trend of the flight size is either increasing or substantially stable and the trend of the transmission rate is decreasing.

9. The method of claim 8, wherein the current and the new congestion control states specify respectively a current and a new rule for increasing the flight size upon receipt of data acknowledgements, and the new rule produces a faster rate of increasing the flight size than the current rule.

10. The method of claim 8, wherein the current and the new congestion control states specify respectively a current and a new rule for modifying the flight size upon receipt of data acknowledgements, and the new rule produces higher flight size values than the current rule.

11. An apparatus for controlling, in a transmitting node, congestion in a data communication protocol employing acknowledged communication in which the transmitting node transmits data to a receiving node and the receiving node acknowledges receipt of the data, the apparatus comprising:

at least one processor; and
at least one memory storing instructions that, when executed by the at least one processor, cause the at least one processor to:
  measure a flight size indicating an amount of data sent by the transmitting node and not yet acknowledged by the receiving node;
  measure a transmission rate;
  determine a trend of the flight size;
  determine a trend of the transmission rate, wherein the trend is derived from a transmission rate gradient calculation, in which either the transmission rate measurements or the transmission rate gradient calculations or both, are filtered to reduce their temporal variability;
  detect whether there is a congestion according to the determined trend of the transmission rate and the trend of the flight size;
  upon detection of the congestion, change from a current congestion control state to a new congestion control state; and
  transmit data while respecting a maximum amount of unacknowledged data which the transmitting node may transmit.

12. The apparatus of claim 11, wherein the current and the new congestion control states specify respectively a current and a new rule for increasing the flight size upon receipt of data acknowledgements, and the new rule produces a slower rate of increasing the flight size than the current rule.

13. The apparatus of claim 11, wherein the congestion is detected when the trend of the flight size is increasing and the trend of the transmission rate is substantially stable.

14. The apparatus of claim 13, wherein the current and the new congestion control states specify respectively a current and a new rule for increasing the flight size upon receipt of data acknowledgements, and the new rule produces a slower rate of increasing the flight size than the current rule.

15. The apparatus of claim 13, wherein the current and the new congestion control states specify respectively a current and a new rule for modifying the flight size upon receipt of data acknowledgements, and the new rule produces lower flight size values than the current rule.

16. The apparatus of claim 15, wherein the trend of the flight size is calculated as a comparison of the current flight size and an estimate of a previous flight size.

17. The apparatus of claim 11, wherein the trend of the flight size is calculated as a comparison of the current flight size and an estimate of a previous flight size.

18. The apparatus of claim 11, wherein the congestion is detected when the trend of the flight size is either increasing or substantially stable and the trend of the transmission rate is decreasing.

19. The apparatus of claim 18, wherein the current and the new congestion control states specify respectively a current and a new rule for increasing the flight size upon receipt of data acknowledgements, and the new rule produces a faster rate of increasing the flight size than the current rule.

20. The apparatus of claim 18, wherein the current and the new congestion control states specify respectively a current and a new rule for modifying the flight size upon receipt of data acknowledgements, and the new rule produces higher flight size values than the current rule.

21. A method for congestion control in a data communication protocol employing acknowledged communication in which a transmitting node transmits data to a receiving node and the receiving node acknowledges receipt of the data, the method to be performed by the transmitting node and comprising:

measuring a flight size indicating an amount of data sent by the transmitting node and not yet acknowledged by the receiving node;
measuring a transmission rate;
determining a trend of the flight size;
determining a trend of the transmission rate, wherein the trend is derived from a transmission rate gradient calculation, in which either the transmission rate measurements or the transmission rate gradient calculations or both, are filtered to reduce their temporal variability;
detecting whether there is a congestion according to the determined trend of the transmission rate and the trend of the flight size;

upon detection of the congestion, modifying the flight size; and transmitting data while respecting a maximum amount of unacknowledged data which the transmitting node may transmit.

22. The method of claim 21, wherein
the congestion is detected when the trend of the flight size is either increasing or substantially stable and the trend of the transmission rate is decreasing.

23. The method of claim 22, wherein modifying the flight size comprises increasing the flight size upon detecting the congestion.

24. The method of claim 22, wherein
modifying the flight size comprises changing from a current congestion control state to a new congestion control state upon detecting the congestion, wherein the current and the new congestion control states specify respectively a current and a new rule for increasing the flight size upon receipt of data acknowledgements, and
the new rule produces a faster rate of increasing the flight size than the current rule.

25. The method of claim 22, wherein modifying the flight size comprises changing from a current congestion control state to a new congestion control state upon detecting the congestion, wherein the current and the new congestion control states specify respectively a current and a new rule for setting the flight size upon receipt of data acknowledgements, and the new rule produces higher flight size values than the current rule.

26. The method of claim 21, wherein
the congestion is detected when the trend of the flight size is increasing and the trend of the transmission rate is substantially stable.

27. The method of claim 26, wherein modifying the flight size comprises changing from a current congestion control state to a new congestion control state upon detecting the congestion, wherein the current and the new congestion control states specify respectively a current and a new rule for modifying the flight size upon receipt of data acknowledgements, and the new rule produces lower flight size values than the current rule.

28. The method of claim 27, wherein the trend of the flight size is calculated as a comparison of the current flight size and an estimate of a previous flight size.

29. The method of claim 26, wherein
modifying the flight size comprises changing from a current congestion control state to a new congestion control state upon detecting the congestion, wherein the current and the new congestion control states specify respectively a current and a new rule for increasing the flight size upon receipt of data acknowledgements, and
the new rule produces a slower rate of increasing the flight size than the current rule.

30. The method of claim 21, wherein the trend of the flight size is calculated as a comparison of the current flight size and an estimate of a previous flight size.

* * * * *